Figure 1:
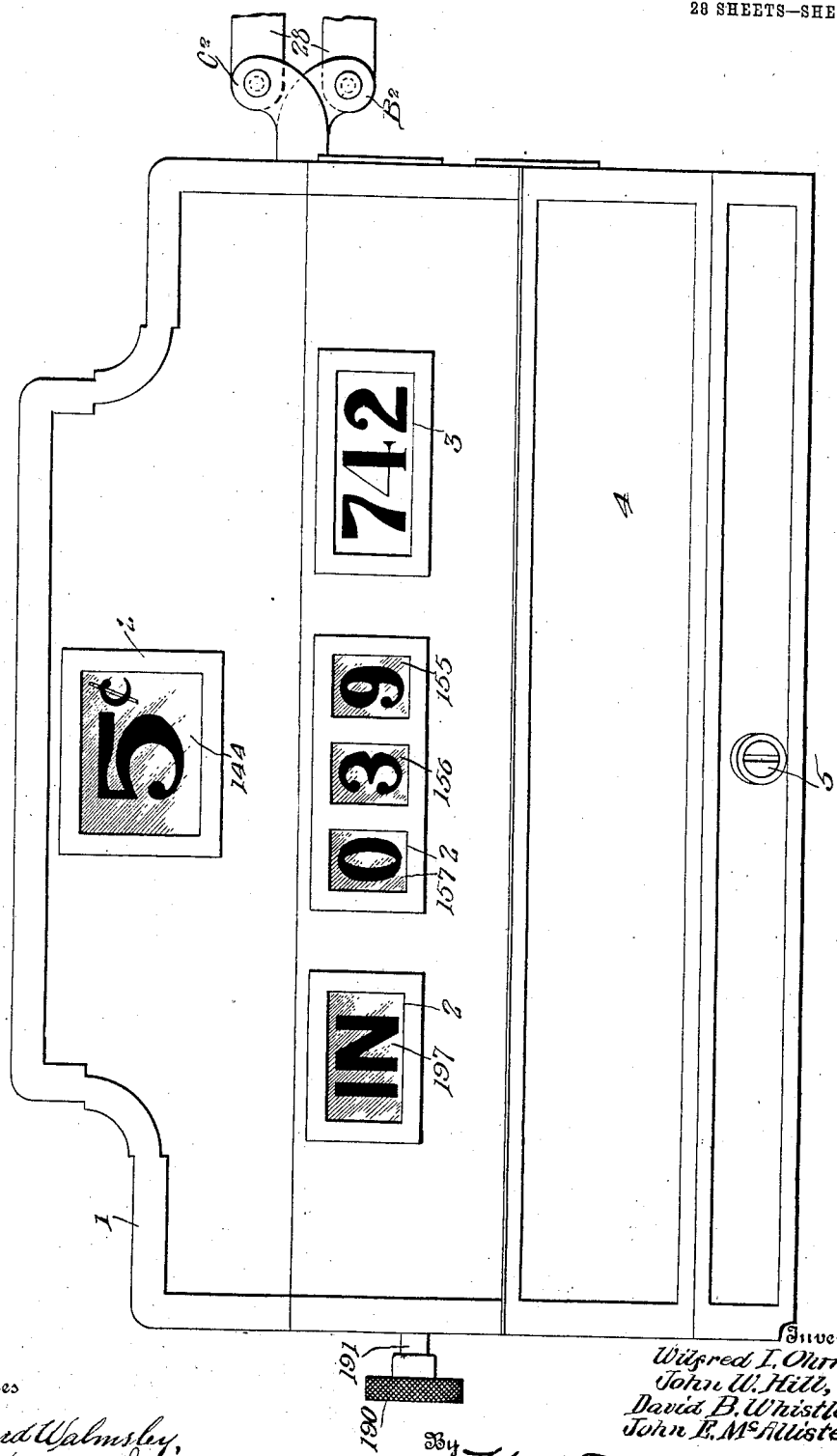

No. 839,630. PATENTED DEC. 25, 1906.
W. I. OHMER, J. W. HILL, D. B. WHISTLER & J. E. McALLISTER.
FARE REGISTER AND RECORDER.
APPLICATION FILED MAY 24, 1906.

28 SHEETS—SHEET 1.

No. 839,630. PATENTED DEC. 25, 1906.
W. I. OHMER, J. W. HILL, D. B. WHISTLER & J. E. McALLISTER.
FARE REGISTER AND RECORDER.
APPLICATION FILED MAY 24, 1906.

28 SHEETS—SHEET 2.

Witnesses
G. Howard Walmsley.
H. L. Hammaker.

Inventors
Wilfred I. Ohmer,
John W. Hill,
David B. Whistler,
John E. McAllister,
By H. A. Toulmin
Attorney No. 839,630. PATENTED DEC. 25, 1906.
W. I. OHMER, J. W. HILL, D. B. WHISTLER & J. E. McALLISTER.
FARE REGISTER AND RECORDER.
APPLICATION FILED MAY 24, 1906.

28 SHEETS—SHEET 4.

No. 839,630. PATENTED DEC. 25, 1906.
W. I. OHMER, J. W. HILL, D. B. WHISTLER & J. E. McALLISTER.
FARE REGISTER AND RECORDER.
APPLICATION FILED MAY 24, 1906.

28 SHEETS—SHEET 5.

Witnesses
G. Howard Walmsley.
A. L. Hammaker.

Inventors
Wilfred I. Ohmer,
John W. Hill,
David B. Whistler,
John E. McAllister,
By H. S. Toulmin.
Attorney No. 839,630. PATENTED DEC. 25, 1906.
W. I. OHMER, J. W. HILL, D. B. WHISTLER & J. E. McALLISTER.
FARE REGISTER AND RECORDER.
APPLICATION FILED MAY 24, 1906.

28 SHEETS—SHEET 6.

No. 839,630. PATENTED DEC. 25, 1906.
W. I. OHMER, J. W. HILL, D. B. WHISTLER & J. E. McALLISTER.
FARE REGISTER AND RECORDER.
APPLICATION FILED MAY 24, 1906.
28 SHEETS—SHEET 8.
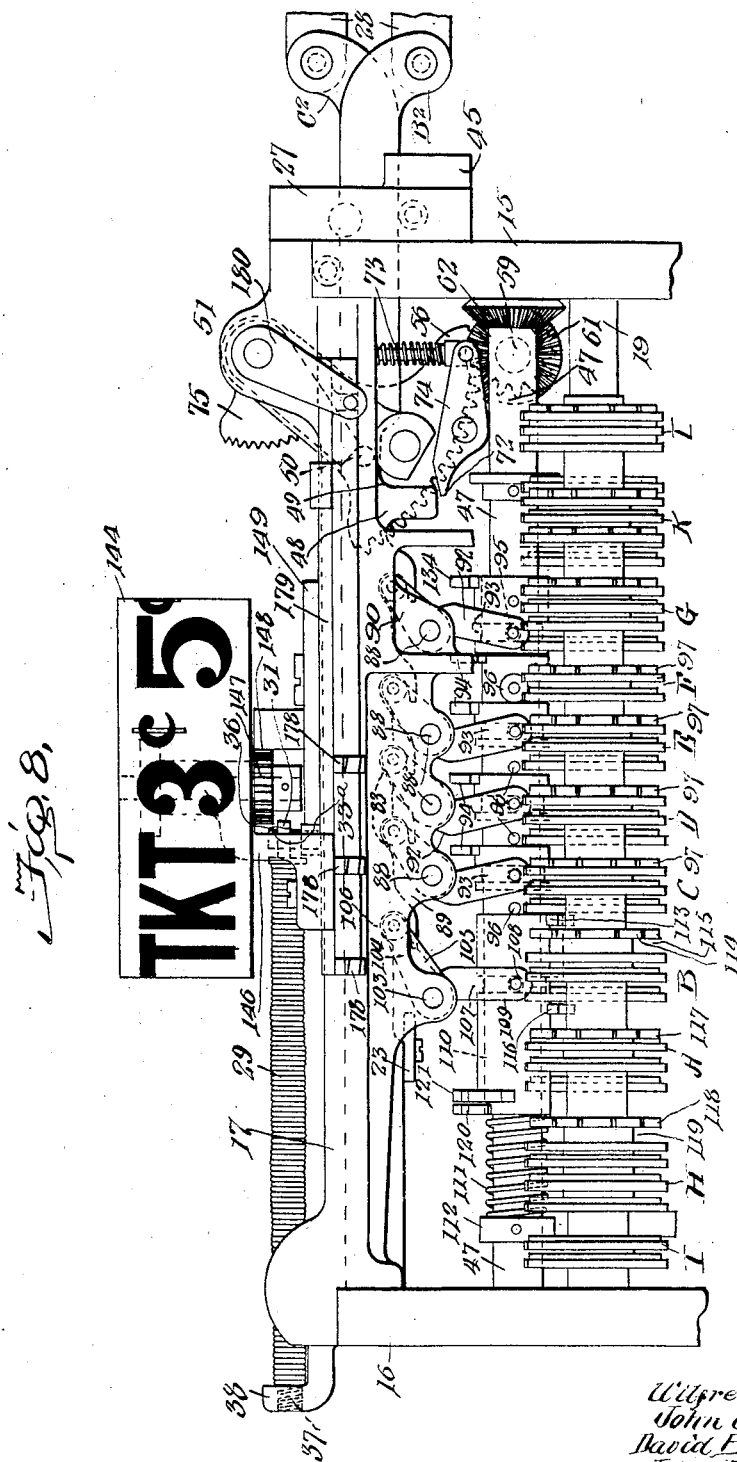
Fig. 8.
Witnesses
G. Howard Walmsley,
H. L. Hammaker.
Inventors
Wilfred J. Ohmer
John W. Hill,
David B. Whistler,
John E. McAllister,
By 
Attorney No. 839,630. PATENTED DEC. 25, 1906.
W. I. OHMER, J. W. HILL, D. B. WHISTLER & J. E. McALLISTER.
FARE REGISTER AND RECORDER.
APPLICATION FILED MAY 24, 1906.

28 SHEETS—SHEET 9.

Witnesses
G. Howard Walmsley.
H. L. Hammaker.

Inventors
Wilfred I. Ohmer,
John W. Hill,
David B. Whistler,
John E. McAllister, Attorney No. 839,630. PATENTED DEC. 25, 1906.
W. I. OHMER, J. W. HILL, D. B. WHISTLER & J. E. McALLISTER.
FARE REGISTER AND RECORDER.
APPLICATION FILED MAY 24, 1906.

28 SHEETS—SHEET 10.

No. 839,630. PATENTED DEC. 25, 1906.
W. I. OHMER, J. W. HILL, D. B. WHISTLER & J. E. McALLISTER.
FARE REGISTER AND RECORDER.
APPLICATION FILED MAY 24, 1906.

28 SHEETS—SHEET 11.

Witnesses
G. Howard Walmsley.
H. L. Hammaker.

Inventors
Wilfred I. Ohmer,
John W. Hill,
David B. Whistler,
John E. McAllister,
By H. A. Toulmin,
Attorney

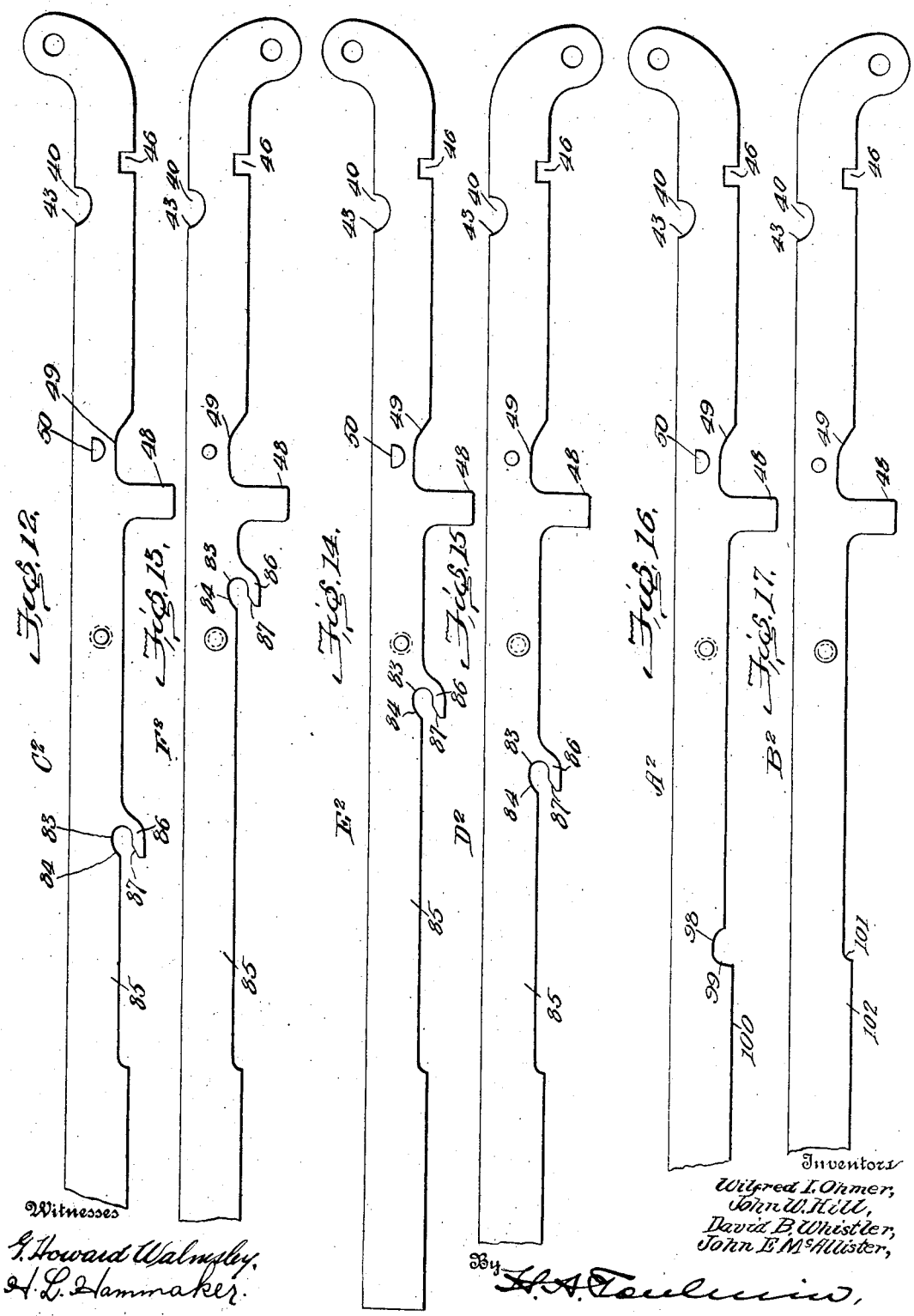

No. 839,630. PATENTED DEC. 25, 1906.
W. I. OHMER, J. W. HILL, D. B. WHISTLER & J. E. McALLISTER.
FARE REGISTER AND RECORDER.
APPLICATION FILED MAY 24, 1906.
28 SHEETS—SHEET 13.
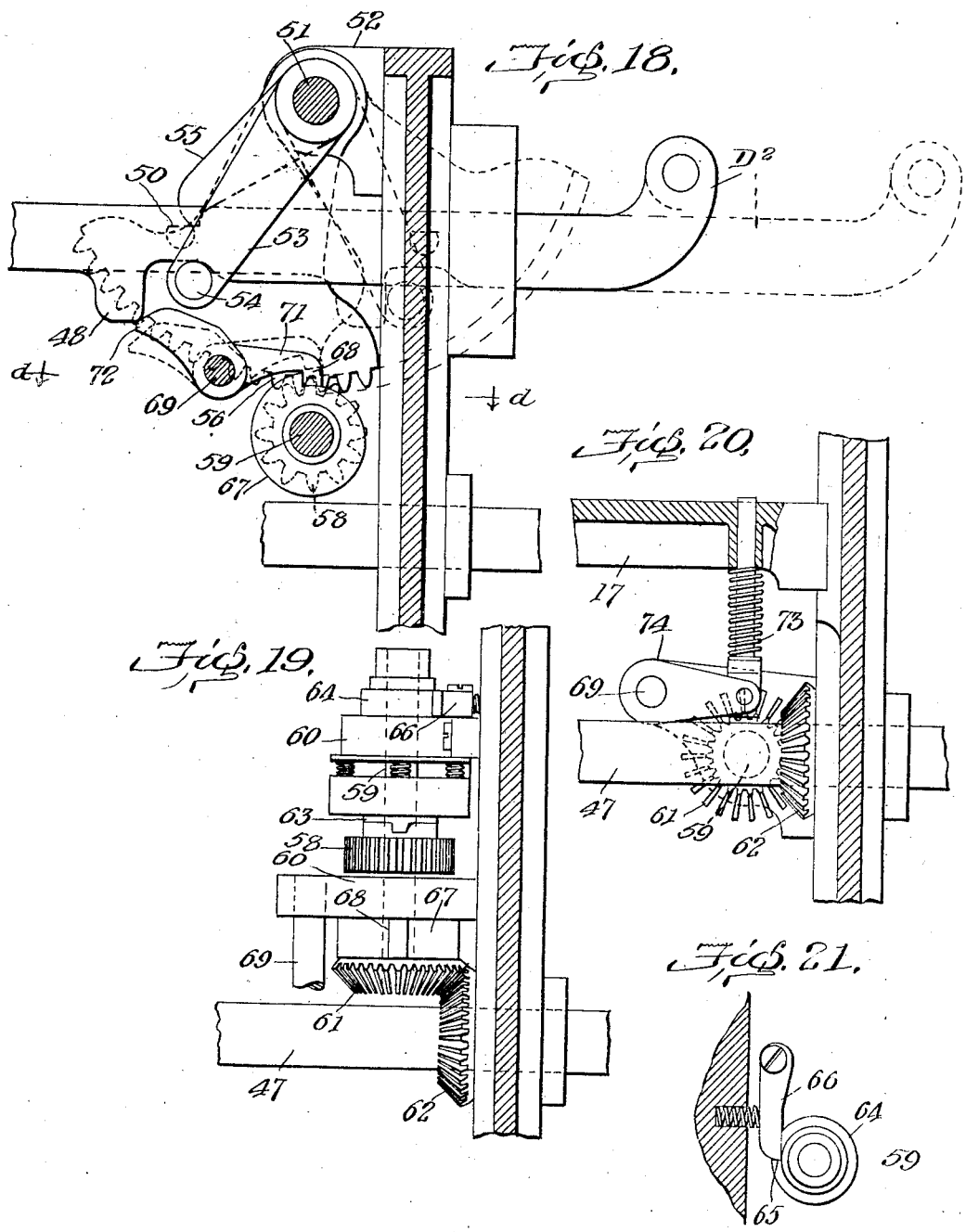
Witnesses
G. Howard Walmsley
H. L. Hammaker
Inventors
Wilfred I. Ohmer
John W. Hill
David B. Whistler
John E. McAllister
By H. A. Toulmin
Attorney

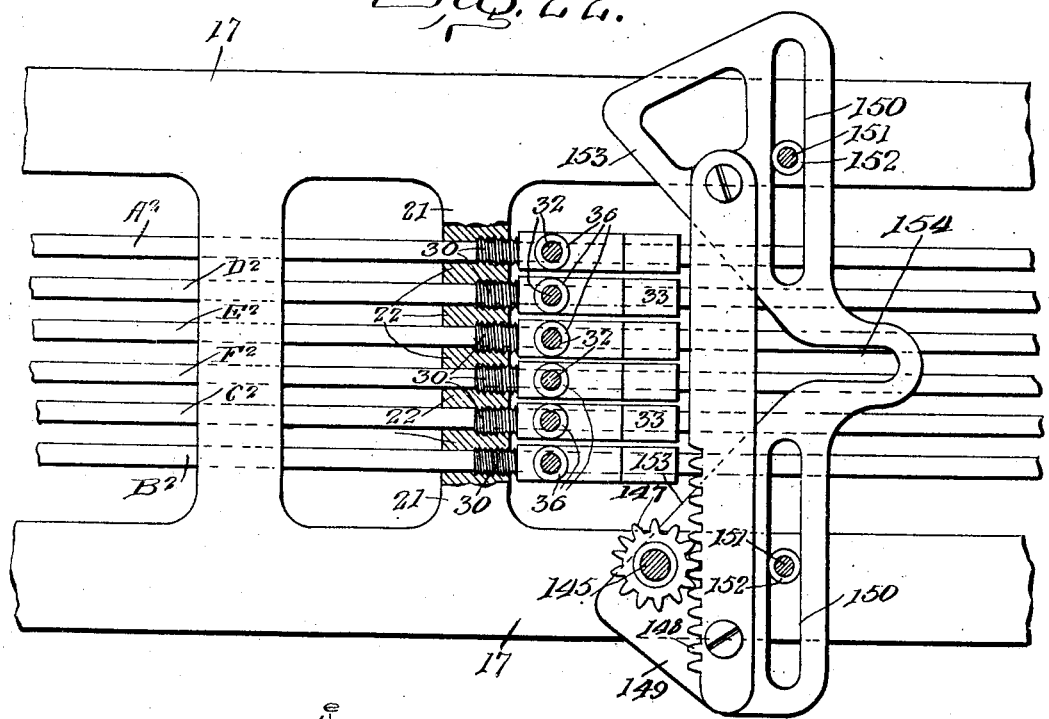

No. 839,630. PATENTED DEC. 25, 1906.
W. I. OHMER, J. W. HILL, D. B. WHISTLER & J. E. McALLISTER.
FARE REGISTER AND RECORDER.
APPLICATION FILED MAY 24, 1906.
28 SHEETS—SHEET 15.
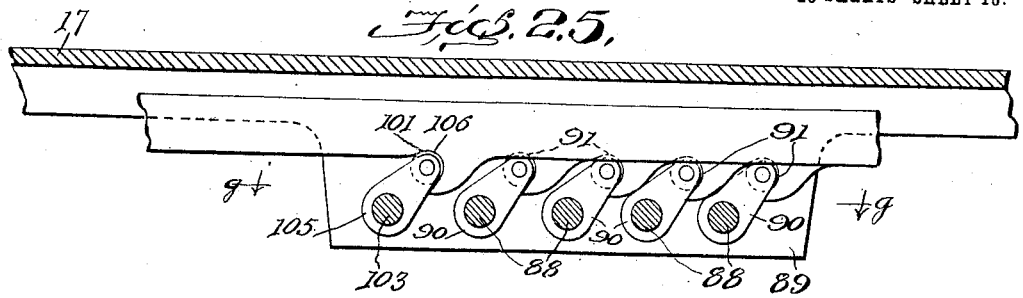
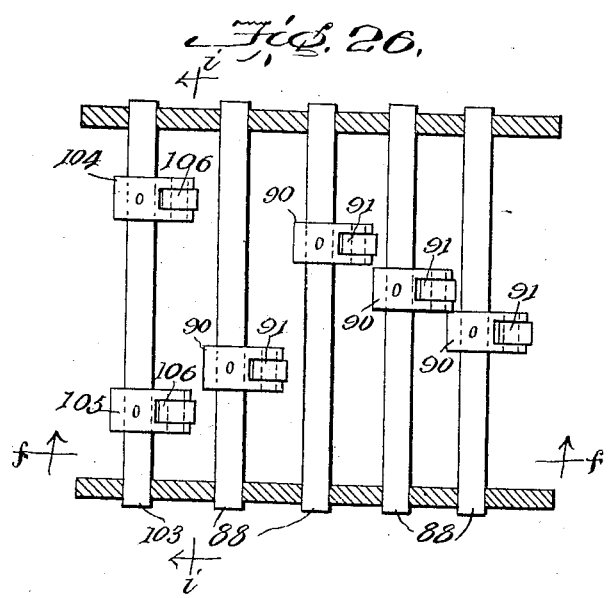
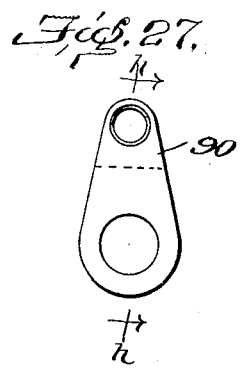
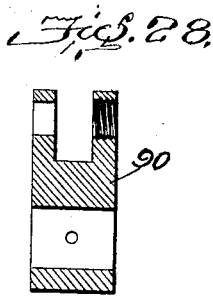
Witnesses
G. Howard Walmsley
H. L. Hammaker
Inventors
Wilfred I. Ohmer,
John W. Hill,
David B. Whistler,
John E. McAllister,
By H. S. Toulmin
Attorney

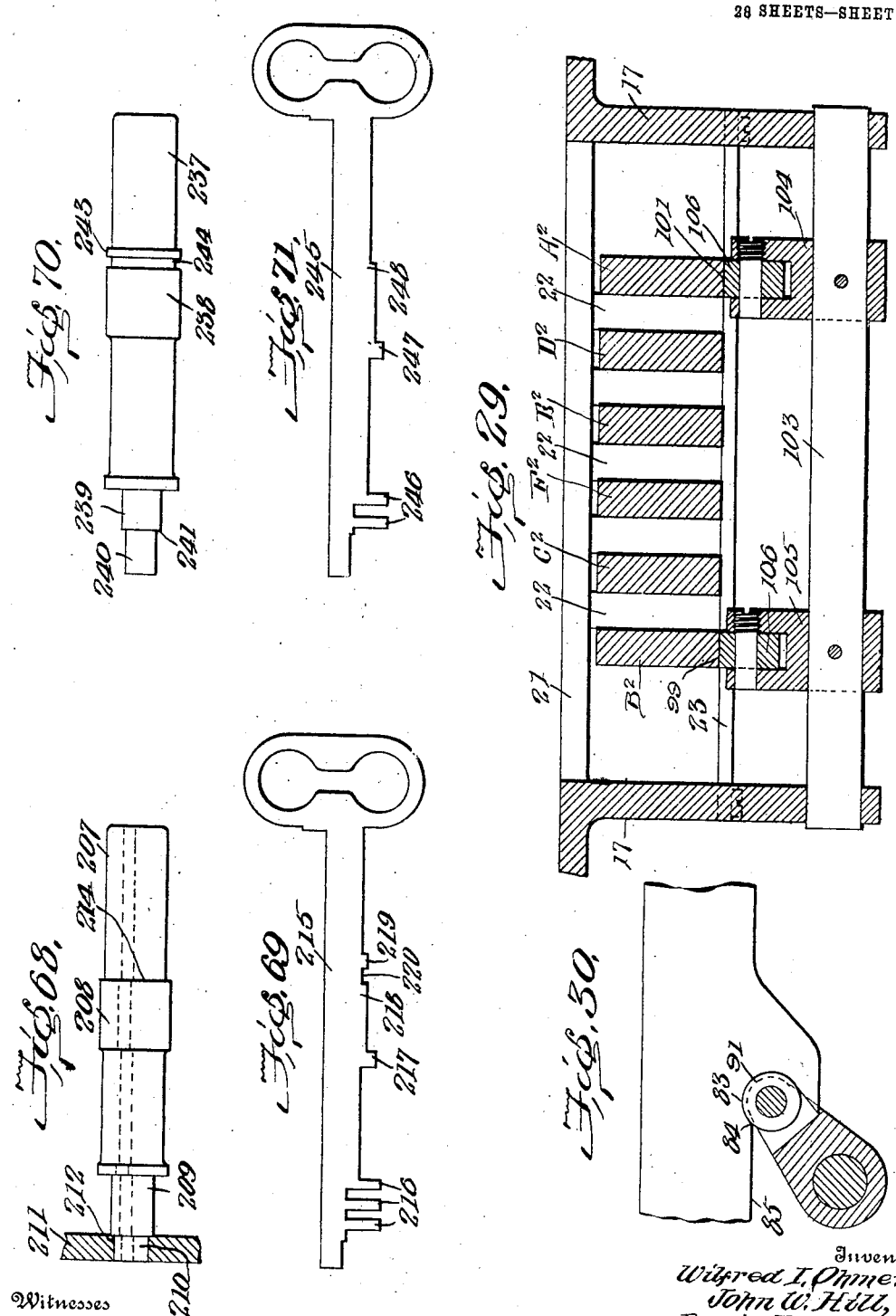

No. 839,630. PATENTED DEC. 25, 1906.
W. I. OHMER, J. W. HILL, D. B. WHISTLER & J. E. McALLISTER.
FARE REGISTER AND RECORDER.
APPLICATION FILED MAY 24, 1906.
28 SHEETS—SHEET 17.
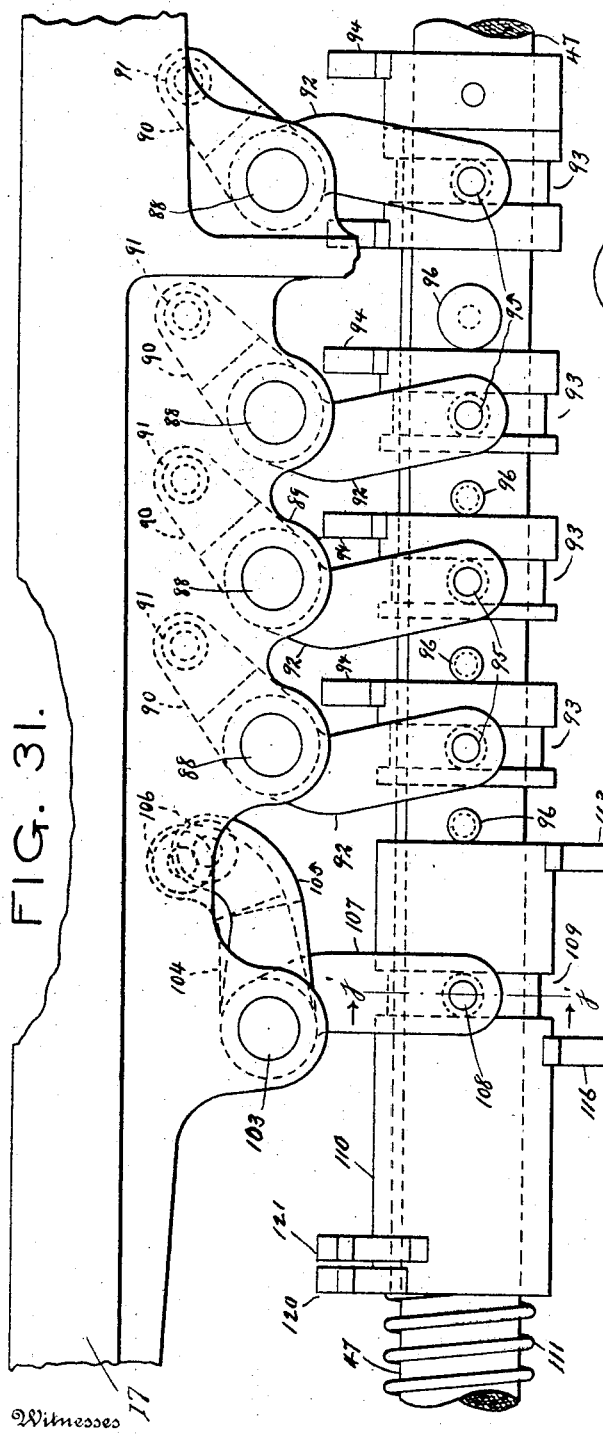
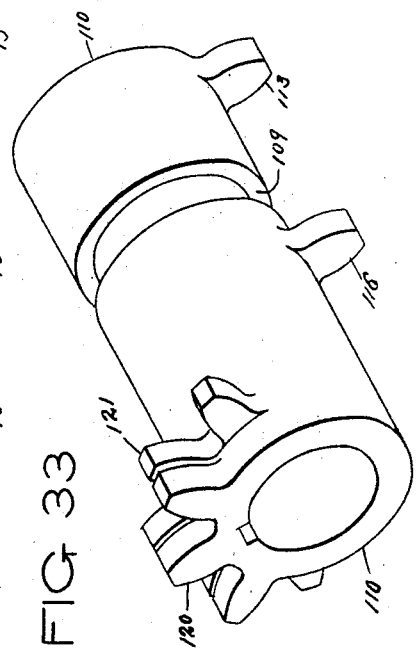
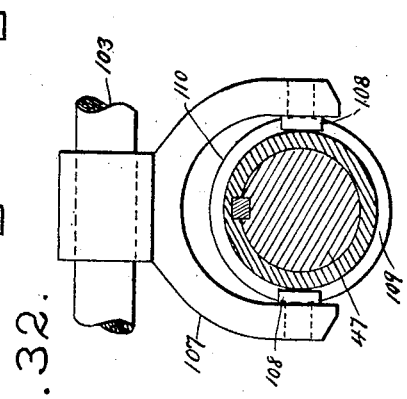

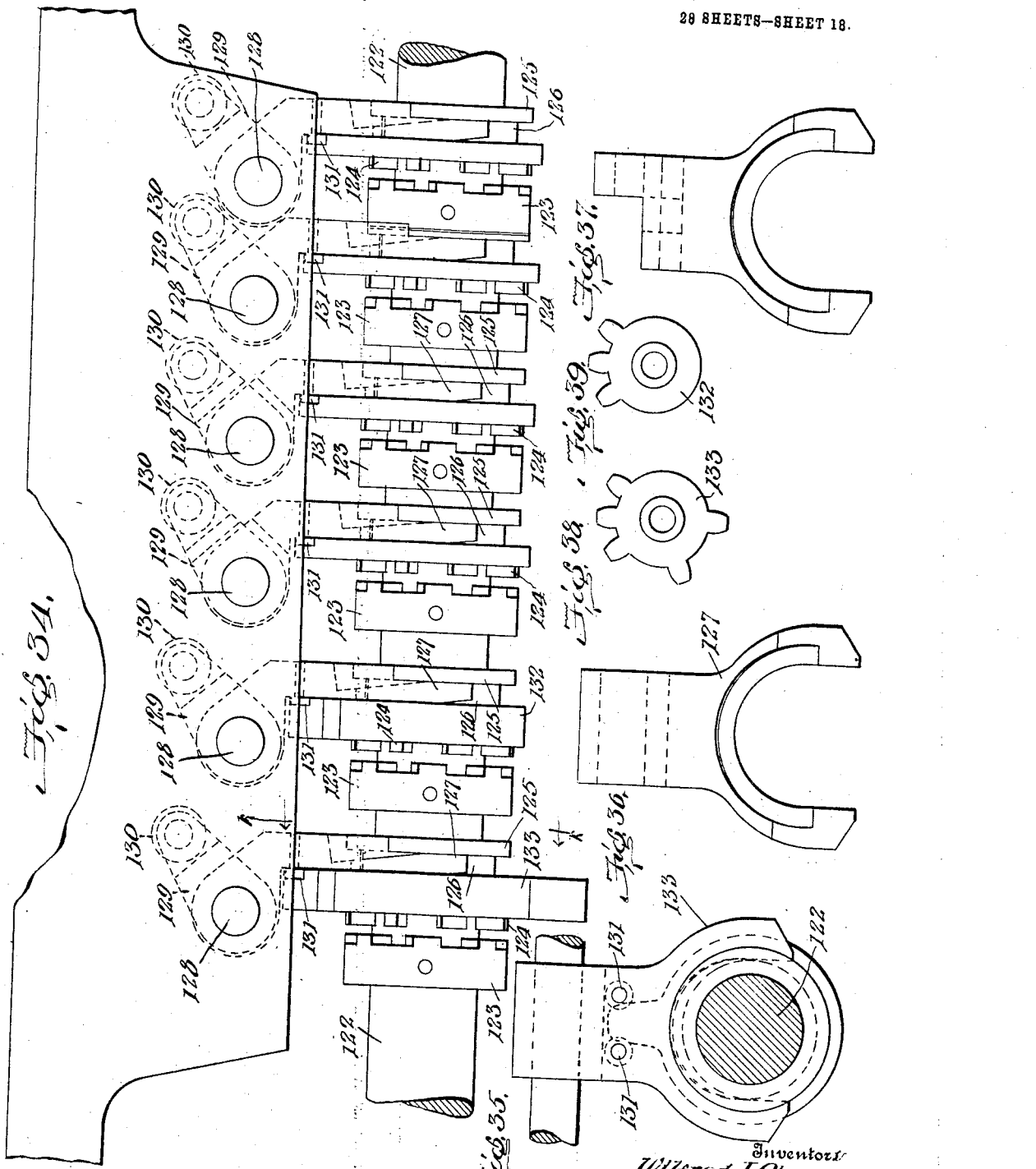

No. 839,630. PATENTED DEC. 25, 1906.
W. I. OHMER, J. W. HILL, D. B. WHISTLER & J. E. McALLISTER.
FARE REGISTER AND RECORDER.
APPLICATION FILED MAY 24, 1906.
28 SHEETS—SHEET 19.
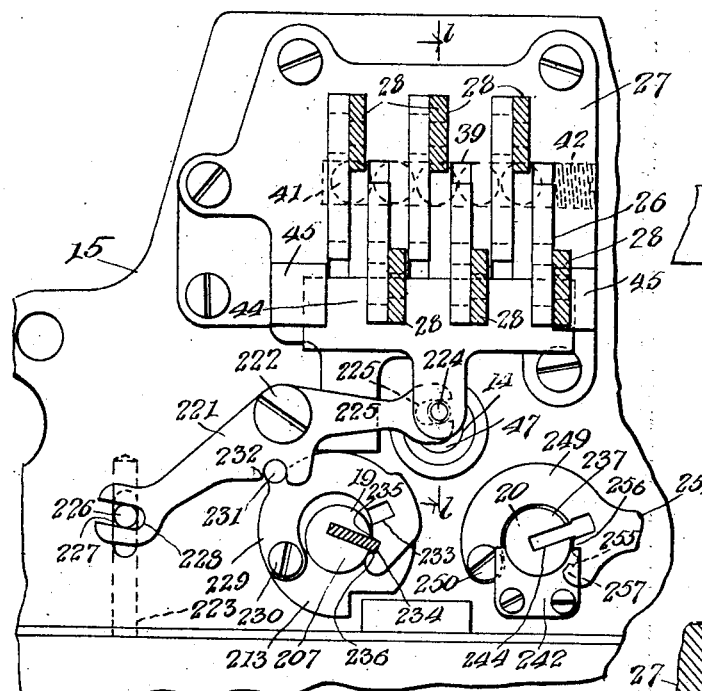
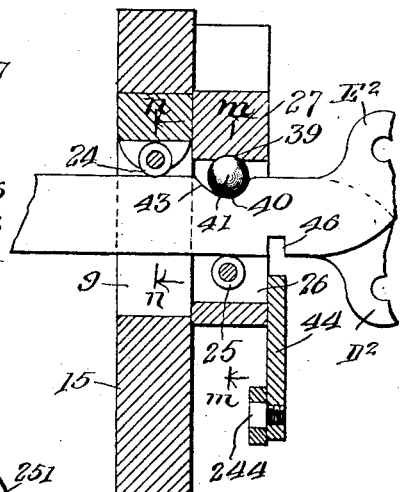
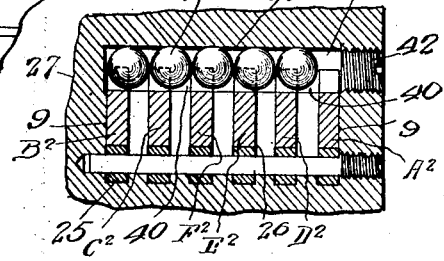
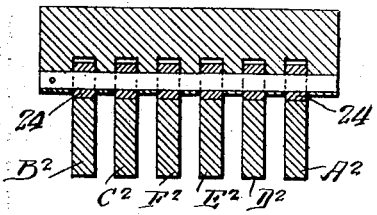
Witnesses
G. Howard Walmsley
H. L. Hammaker
Inventors
Wilfred I. Ohmer,
John W. Hill,
David B. Whistler,
John E. McAllister,
By H. A. Toulmin,
Attorney No. 839,630. PATENTED DEC. 25, 1906.
W. I. OHMER, J. W. HILL, D. B. WHISTLER & J. E. McALLISTER.
FARE REGISTER AND RECORDER.
APPLICATION FILED MAY 24, 1906.
28 SHEETS—SHEET 20.
FIG. 46.
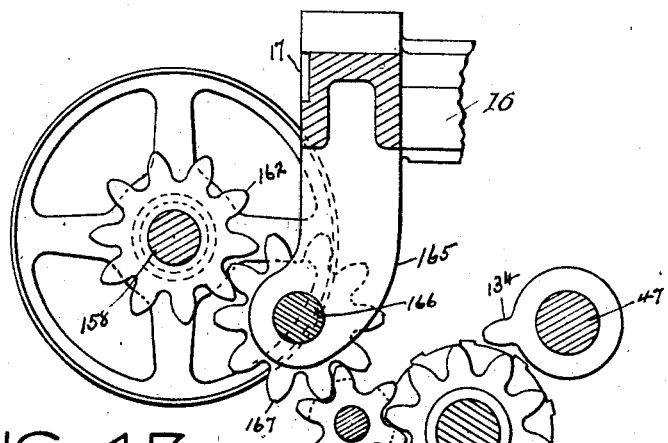
FIG. 47.
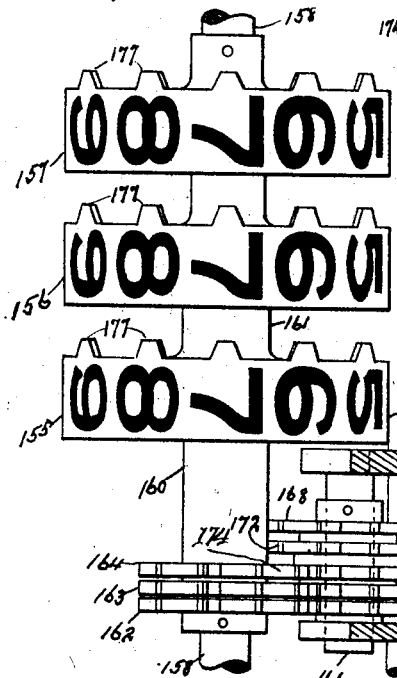
FIG. 48.
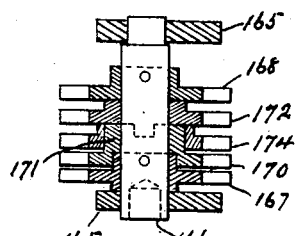
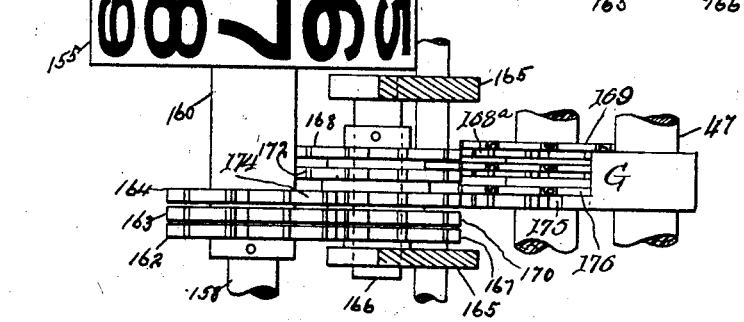
Witnesses
William F. Bauer
H. L. Hammaker
Inventors
Wilfred I. Ohmer
John W. Hill
David B. Whistler
John E. McAllister
By H. A. Toulmin, Attorney No. 839,630. PATENTED DEC. 25, 1906.
W. I. OHMER, J. W. HILL, D. B. WHISTLER & J. E. McALLISTER.
FARE REGISTER AND RECORDER.
APPLICATION FILED MAY 24, 1906.

28 SHEETS—SHEET 21.

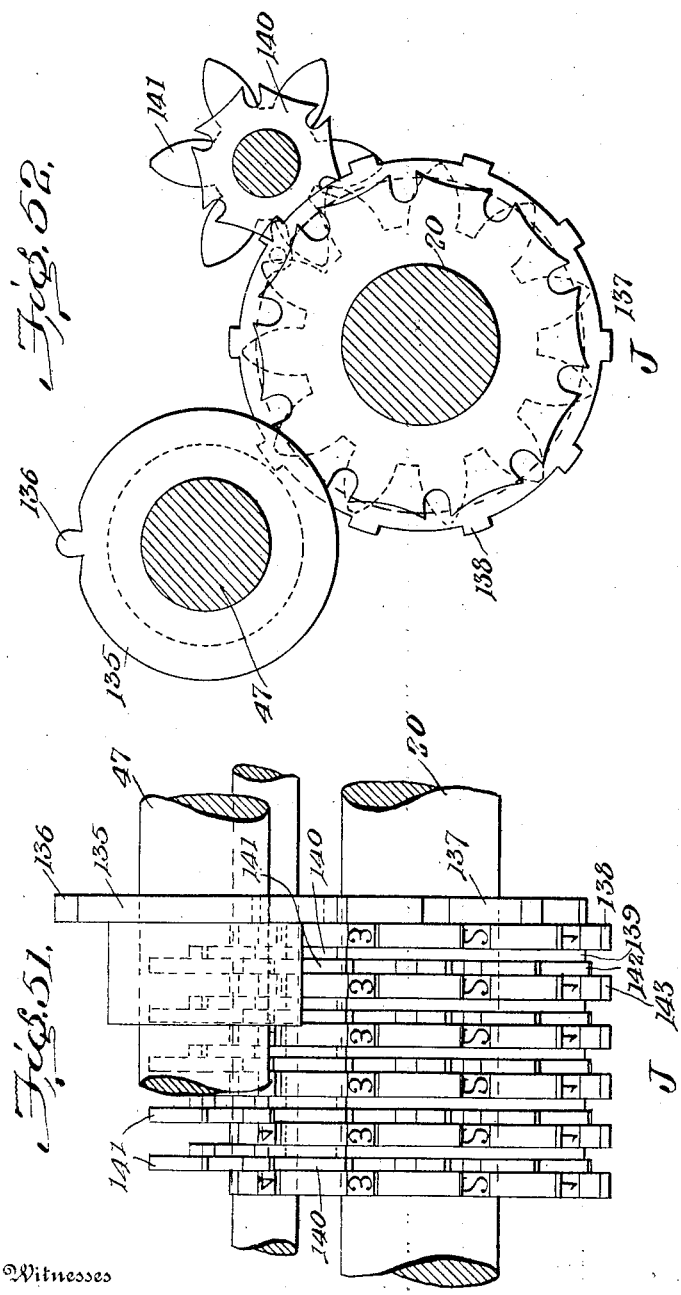

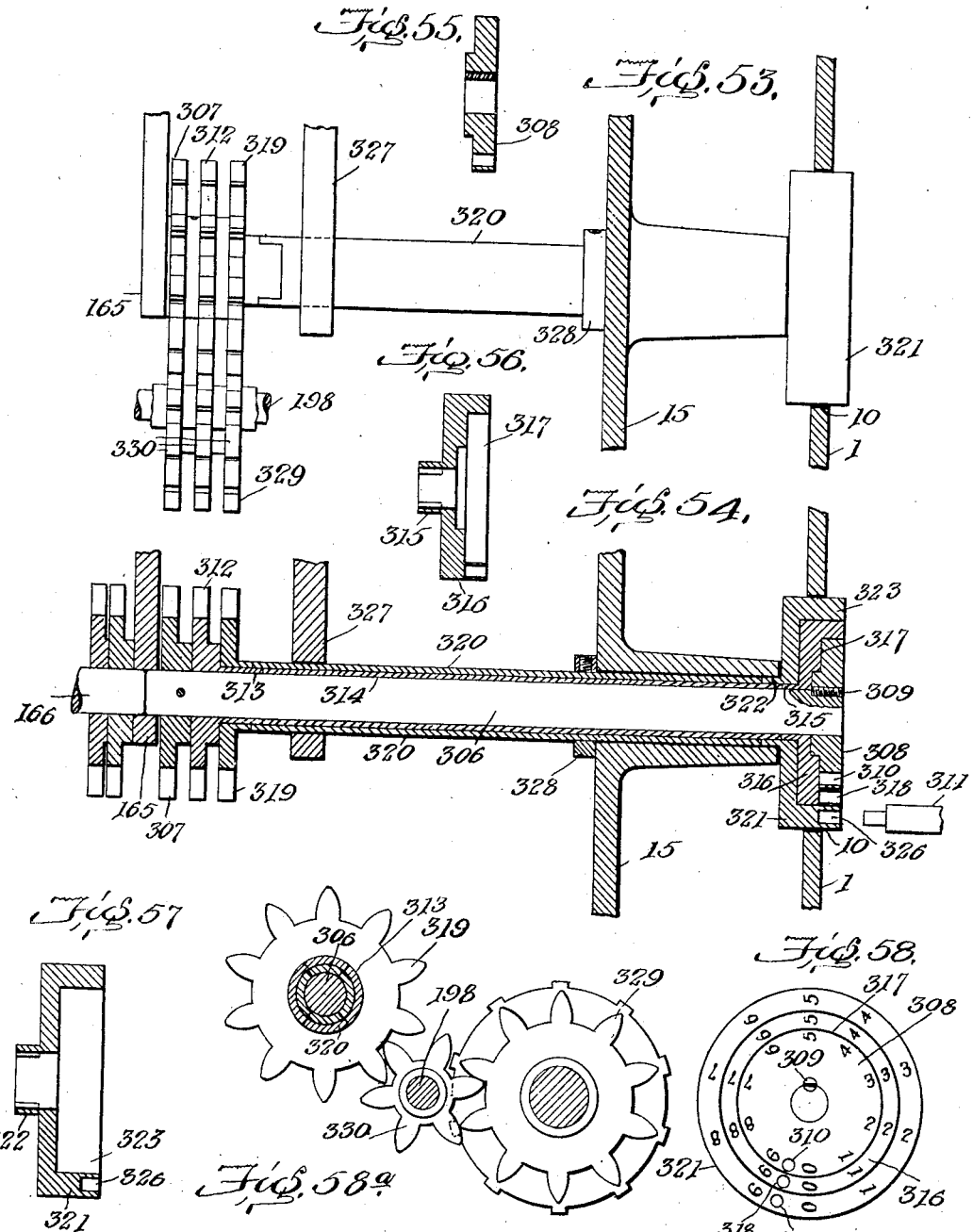

No. 839,630. PATENTED DEC. 25, 1906.
W. I. OHMER, J. W. HILL, D. B. WHISTLER & J. E. McALLISTER.
FARE REGISTER AND RECORDER.
APPLICATION FILED MAY 24, 1906.

28 SHEETS—SHEET 24.

Witnesses
William F. Bauer.
H. L. Hammaker.

Inventors
Wilfred I. Ohmer
John W. Hill
David B. Whistler
John E. McAllister

By H. A. Toulmin, Attorney

No. 839,630. PATENTED DEC. 25, 1906.
W. I. OHMER, J. W. HILL, D. B. WHISTLER & J. E. McALLISTER.
FARE REGISTER AND RECORDER.
APPLICATION FILED MAY 24, 1906.
28 SHEETS—SHEET 25.
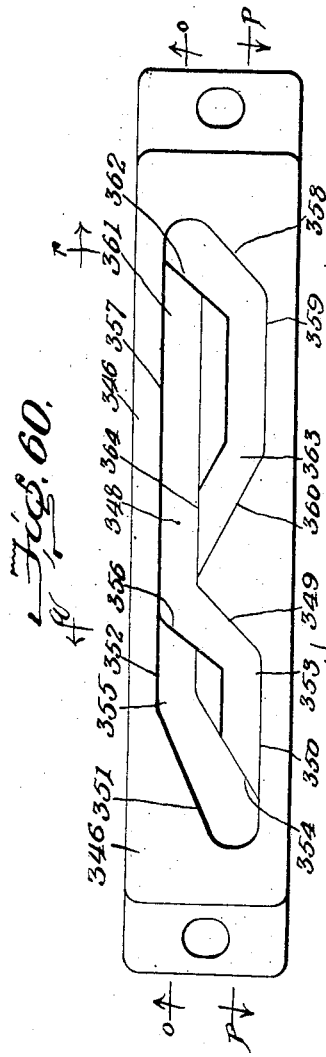
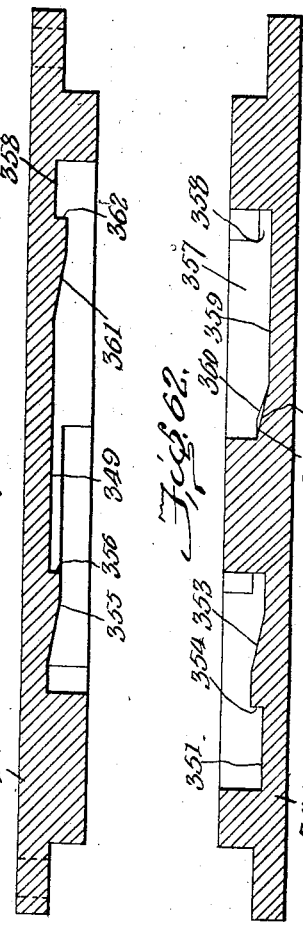
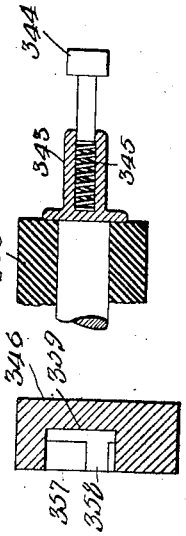
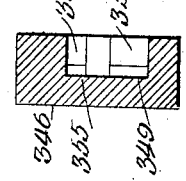
Witnesses
G. Howard Walmsley
H. L. Shoemaker
Inventors
Wilfred I. Ohmer,
John W. Hill,
David B. Whistler,
John E. McAllister,
By H. A. Toulmin
Attorney No. 839,630. PATENTED DEC. 25, 1906.
W. I. OHMER, J. W. HILL, D. B. WHISTLER & J. E. McALLISTER.
FARE REGISTER AND RECORDER.
APPLICATION FILED MAY 24, 1906.
28 SHEETS—SHEET 26.
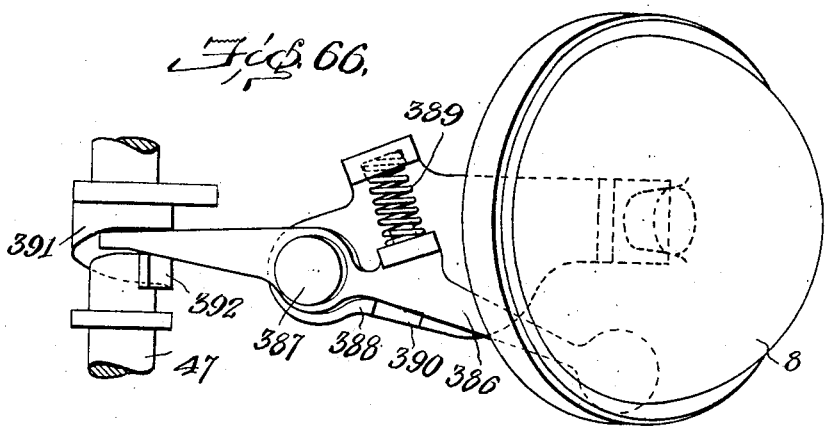
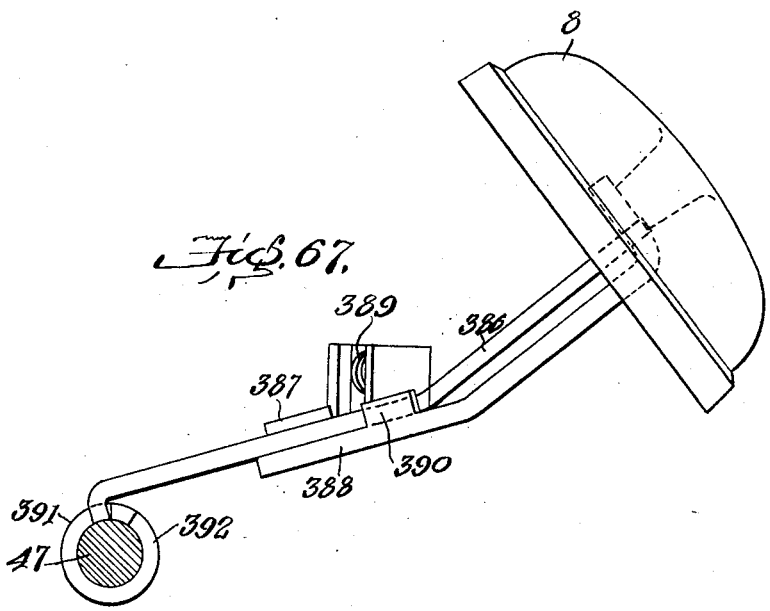
Witnesses
G. Howard Walmsley
H. L. Hammaker
Inventors
Wilfred I. Ohmer,
John W. Hill,
David B. Whistler,
John E. McAllister,
By H. A. Toulmin
Attorney No. 839,630. PATENTED DEC. 25, 1906.
W. I. OHMER, J. W. HILL, D. B. WHISTLER & J. E. McALLISTER.
FARE REGISTER AND RECORDER.
APPLICATION FILED MAY 24, 1906.

28 SHEETS—SHEET 27.

Witnesses
G. Howard Walmsley.
A. L. Hammaker.

Inventors
Wilfred I. Ohmer,
John W. Hill,
David B. Whistler,
John E. McAllister,
By H. A. Toulmin,
Attorney No. 839,630. PATENTED DEC. 25, 1906.
W. I. OHMER, J. W. HILL, D. B. WHISTLER & J. E. McALLISTER.
FARE REGISTER AND RECORDER.
APPLICATION FILED MAY 24, 1906.

28 SHEETS—SHEET 28.

*Fig. 76.*

RECORDER No. 742.  UNION TRACTION COMPANY, DAYTON, OHIO.  DEC 30

| No. of TRIPS | CASH TOTAL | 5c. FARES | 3c. FARES | HALF TICKETS | FULL TICKETS | TRANS-FERS | PASSES | DAILY PASSENGERS | GRAND TOTAL PASSENGERS | CASHIER |
|---|---|---|---|---|---|---|---|---|---|---|
| 02 | 05.58 | 002 | 002 | 002 | 002 | 002 | 02 | 0012 | 026346 | 496 |

DAILY TOTAL RECORD.

| TRIP No. | TRIP CASH | | | | | | | TRIP PASSENGERS | CAR NUMBER | CONDUCTOR |
|---|---|---|---|---|---|---|---|---|---|---|
| 02 | 00.08 | 001 | 001 | 001 | 001 | 001 | 01 | 006 | 989 | 379 |
| 01 | 00.08 | 001 | 001 | 001 | 001 | 001 | 01 | 006 | 989 | 379 |

CONSECUTIVE TRIP RECORD.

Witnesses
G. Howard Walmsley,
H. L. Hammaker.

Inventors
Wilfred I. Ohmer,
John W. Hill,
David B. Whistler,
John E. McAllister,
By H. A. Toulmin
Attorney

UNITED STATES PATENT OFFICE.

WILFRED I. OHMER, OF DAYTON, OHIO, JOHN W. HILL, OF PROVIDENCE, RHODE ISLAND, AND DAVID B. WHISTLER AND JOHN E. McALLISTER, OF DAYTON, OHIO, ASSIGNORS TO THE RECORDING AND COMPUTING MACHINES COMPANY, OF DAYTON, OHIO, A CORPORATION OF OHIO.

FARE REGISTER AND RECORDER.

No. 839,630.  Specification of Letters Patent.  Patented Dec. 25, 1906.

Application filed May 24, 1906. Serial No. 318,537.

*To all whom it may concern:*

Be it known that we, WILFRED I. OHMER, residing at Dayton, in the county of Montgomery and State of Ohio, JOHN W. HILL, residing at Providence, in the county of Providence and State of Rhode Island, and DAVID B. WHISTLER and JOHN E. McALLISTER, residing at Dayton, aforesaid, citizens of the United States, have invented certain new and useful Improvements in Fare Registers and Recorders, of which the following is a specification, reference being had therein to the accompanying drawings.

This invention relates to fare registers and recorders, being in the general nature of an improvement upon certain prior machines of a similar character heretofore invented by Wilfred I. Ohmer, and more specifically an improvement upon the machine set forth in United States Letters Patent No. 764,494, granted July 5, 1904, to said Wilfred I. Ohmer, assignor to The Recording and Computing Machines Company, assignee of the present application, although certain features of the present invention are applicable to machines other than the particular type of machine set forth in said Letters Patent.

Primarily the object of the present invention is to produce a machine having all the capacities and safeguards of the machine of said Letters Patent, producing a similar record, with trip and daily totals, separately printed by the proper identified employees only, the machine being so organized as to be relatively compact and light, and the counter-actuating mechanism being improved in various respects, which will be hereinafter more fully pointed out.

Among the more important features of novelty of the present case, other than those relating to the counter-actuating mechanism, are the provision of means for insuring a full rotation or operation of the operator's identifying-key, whether conductor's or cashier's, before the locking devices controlled thereby are operated, so that the printing mechanism can be operated only when the operator's identifying number or character is in proper printing position, and the provision of means whereby the operator is compelled to print a record from the counters of his department before he can operate the resetting-shaft to reset said counters to zero.

The invention further has for its object to improve the mechanism of the apparatus with regard to various features, which will be hereinafter more specifically set forth.

To the foregoing and other ends the invention consists in certain novel features, which will be hereinafter described, and then specifically pointed out in the claims.

In the accompanying drawings a machine constituting one embodiment of the invention is shown, the same being in the form of a machine adapted to register and record six different specific fares, being therefore in the nature of a machine particularly adapted for use on street-cars, although it is obvious that the machine may be adapted for use in connection with other numbers of specific fares, and it will be seen that certain features of the invention are applicable to machines other than street-car machines.

Figure 2:
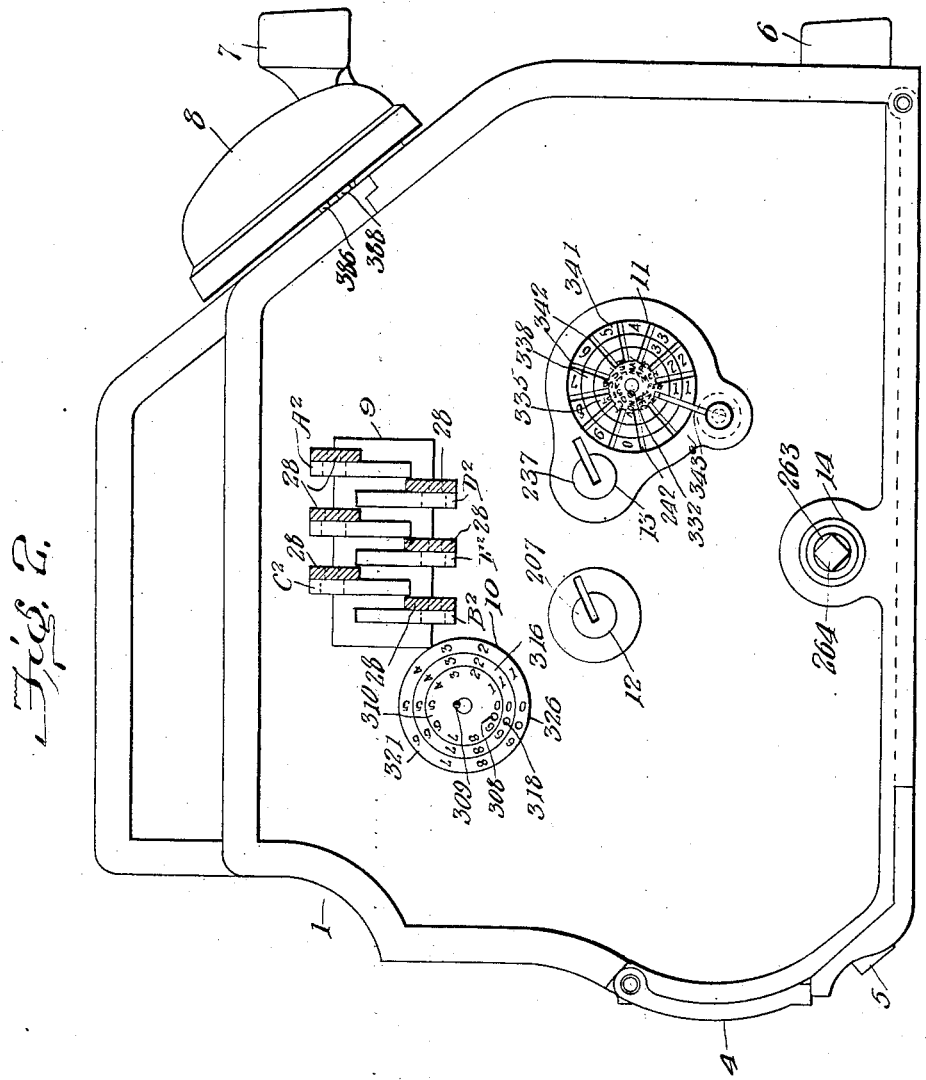
Figure 3:
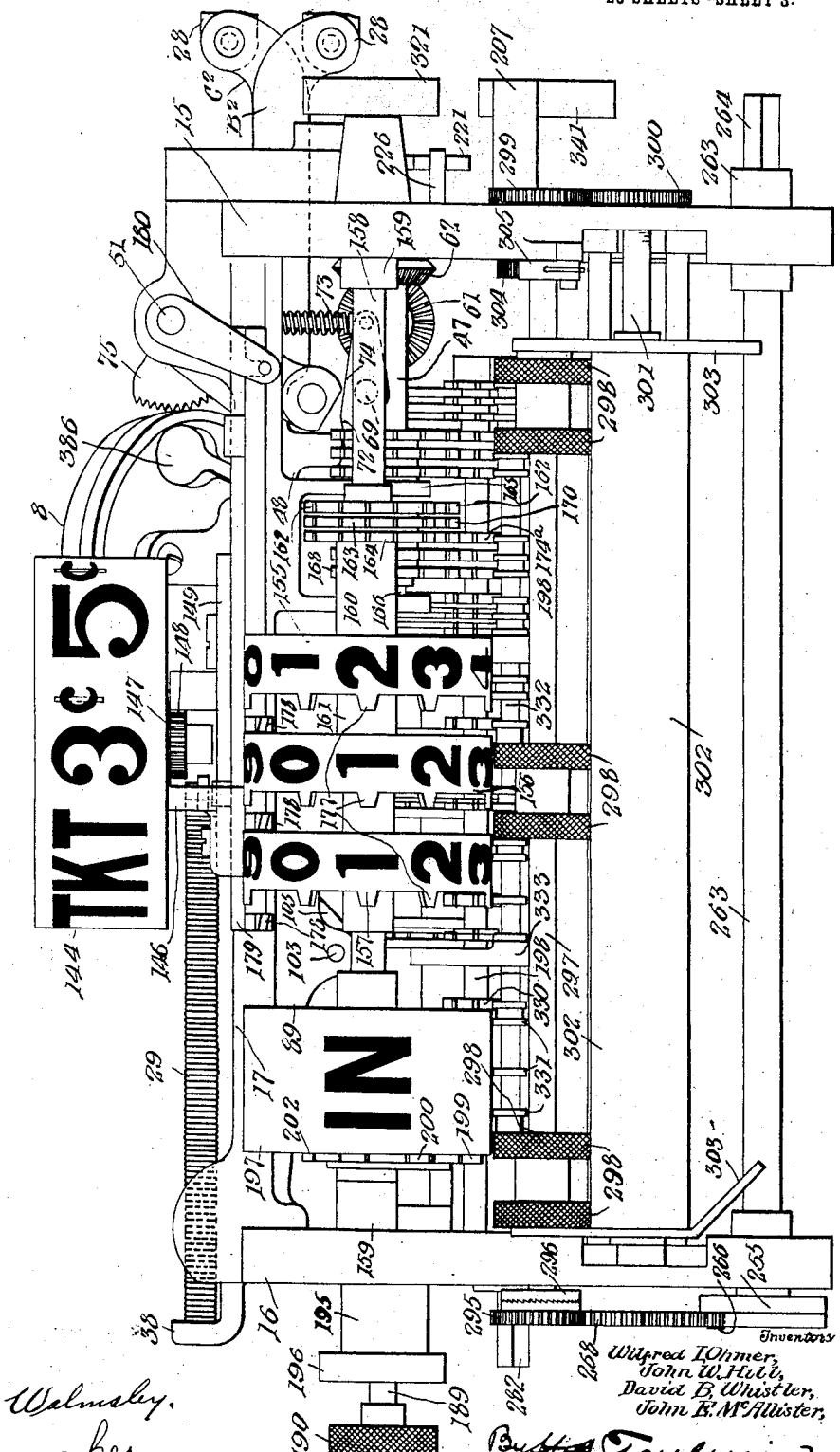
Figure 4:
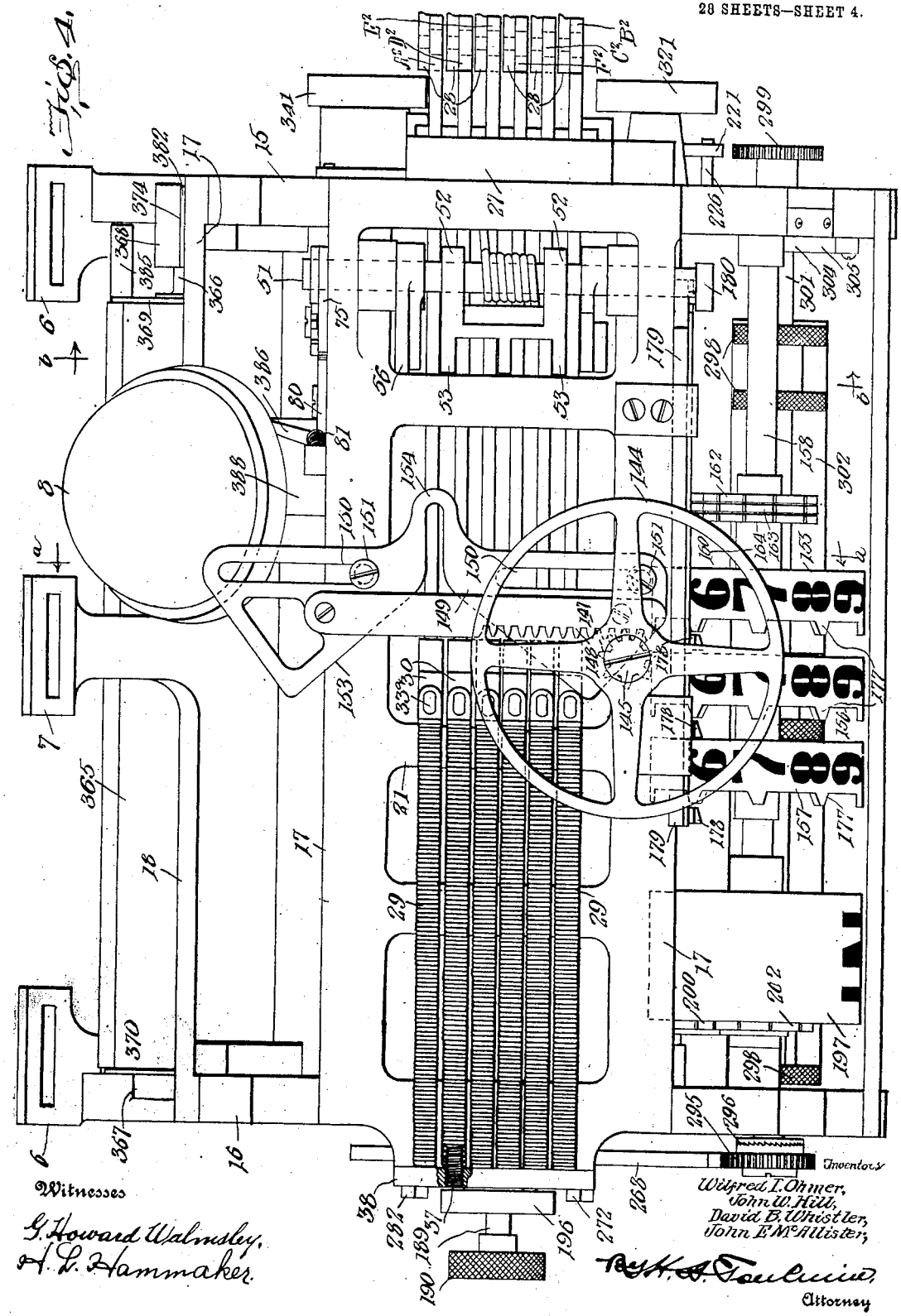
Figure 5:
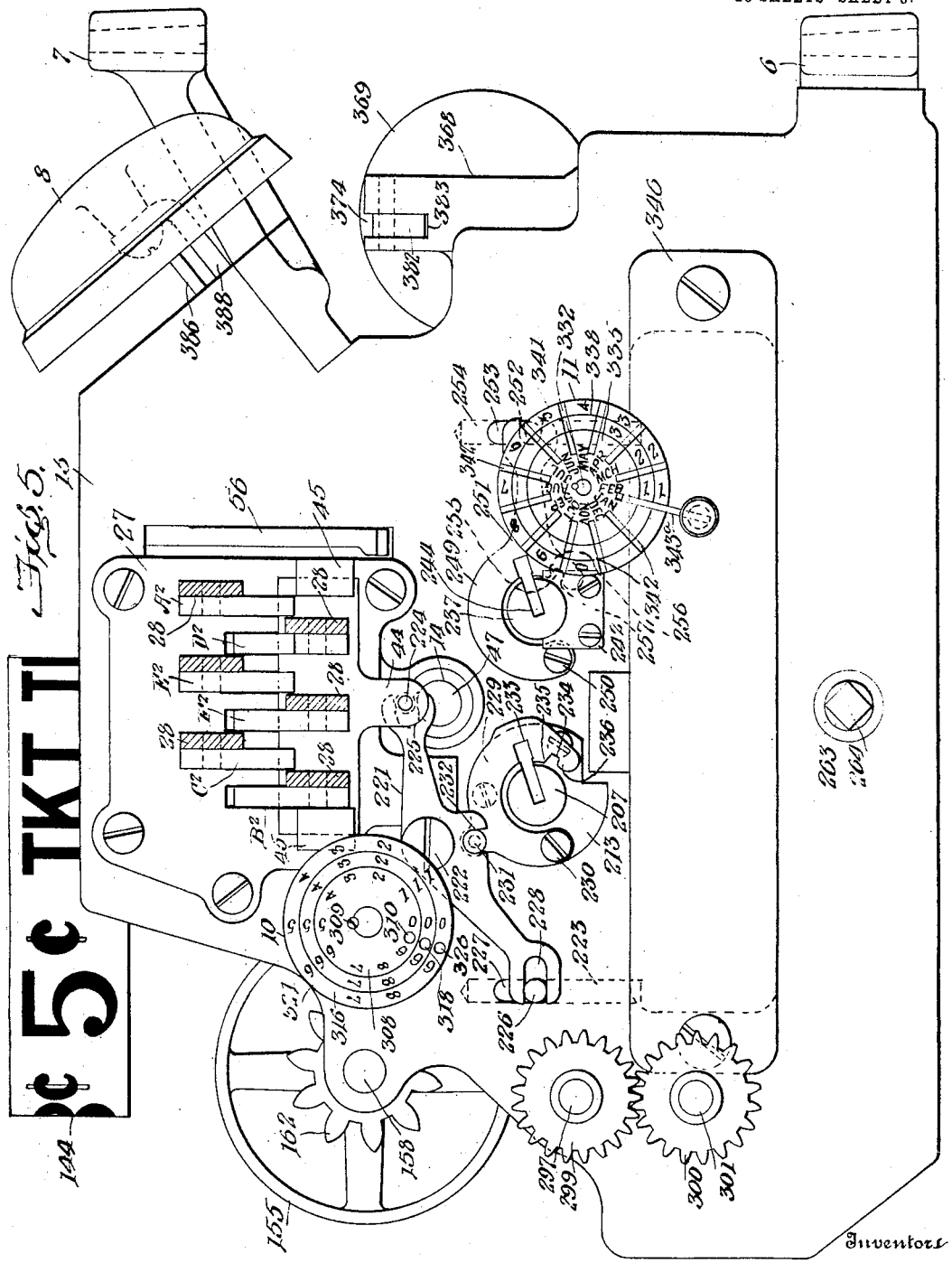
Figure 6:
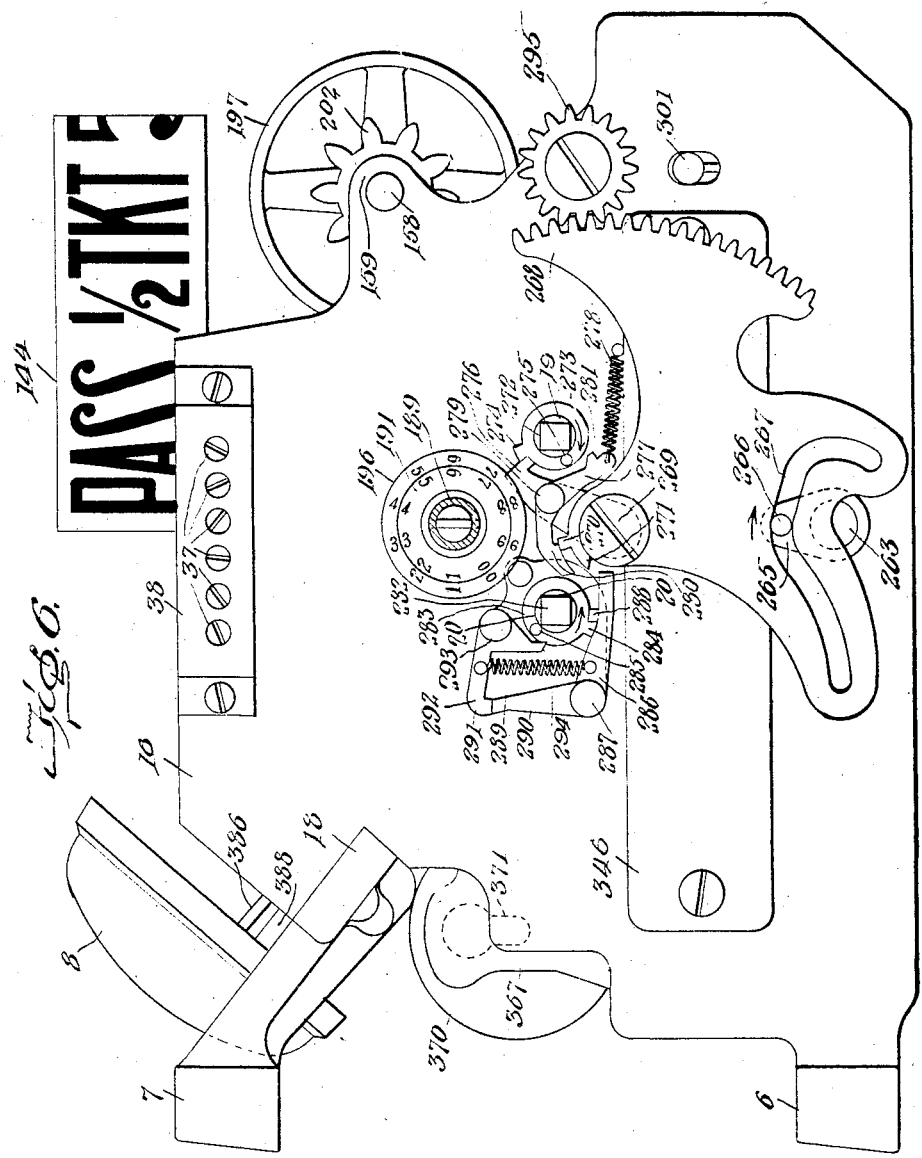
Figure 7:
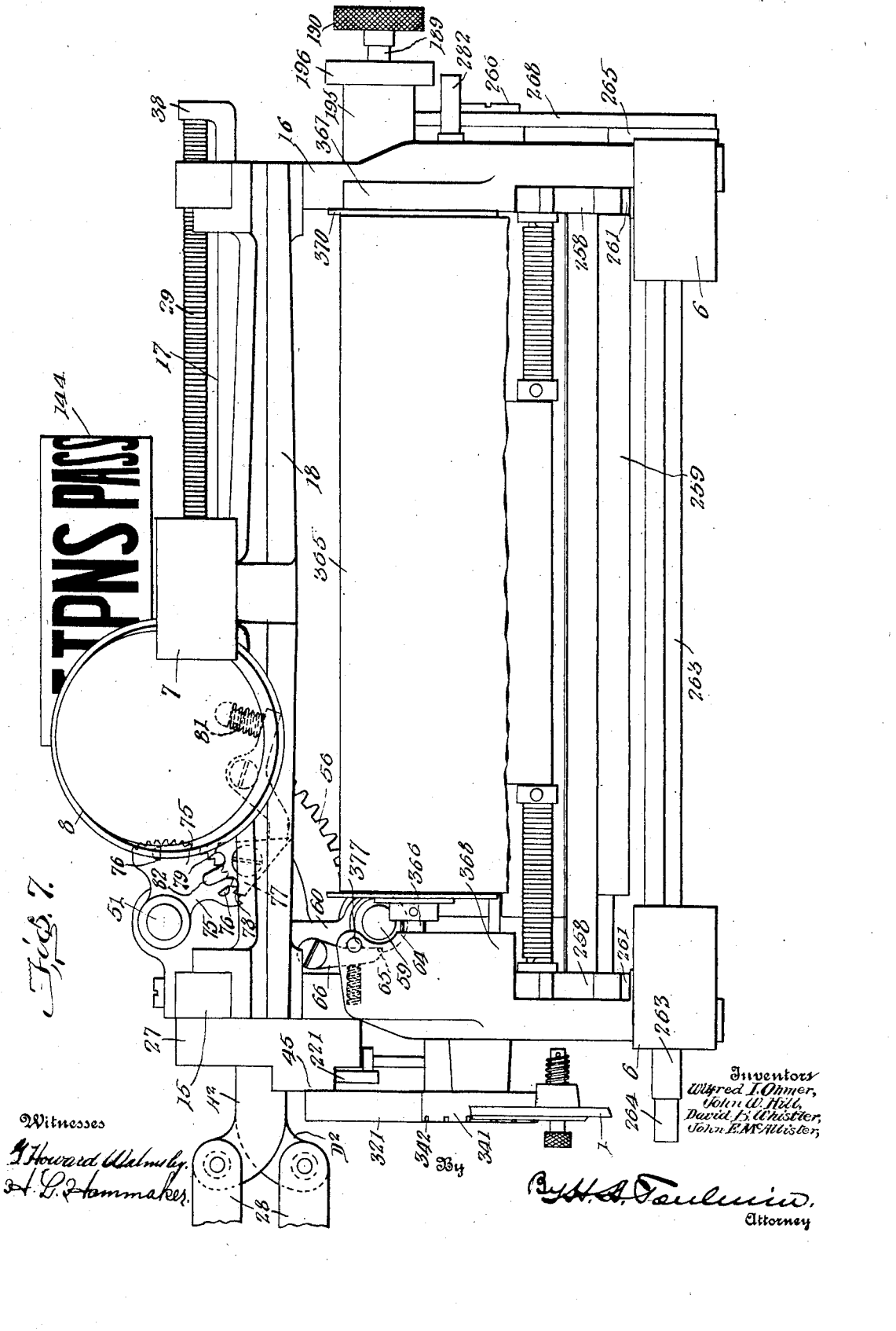
Figure 9:
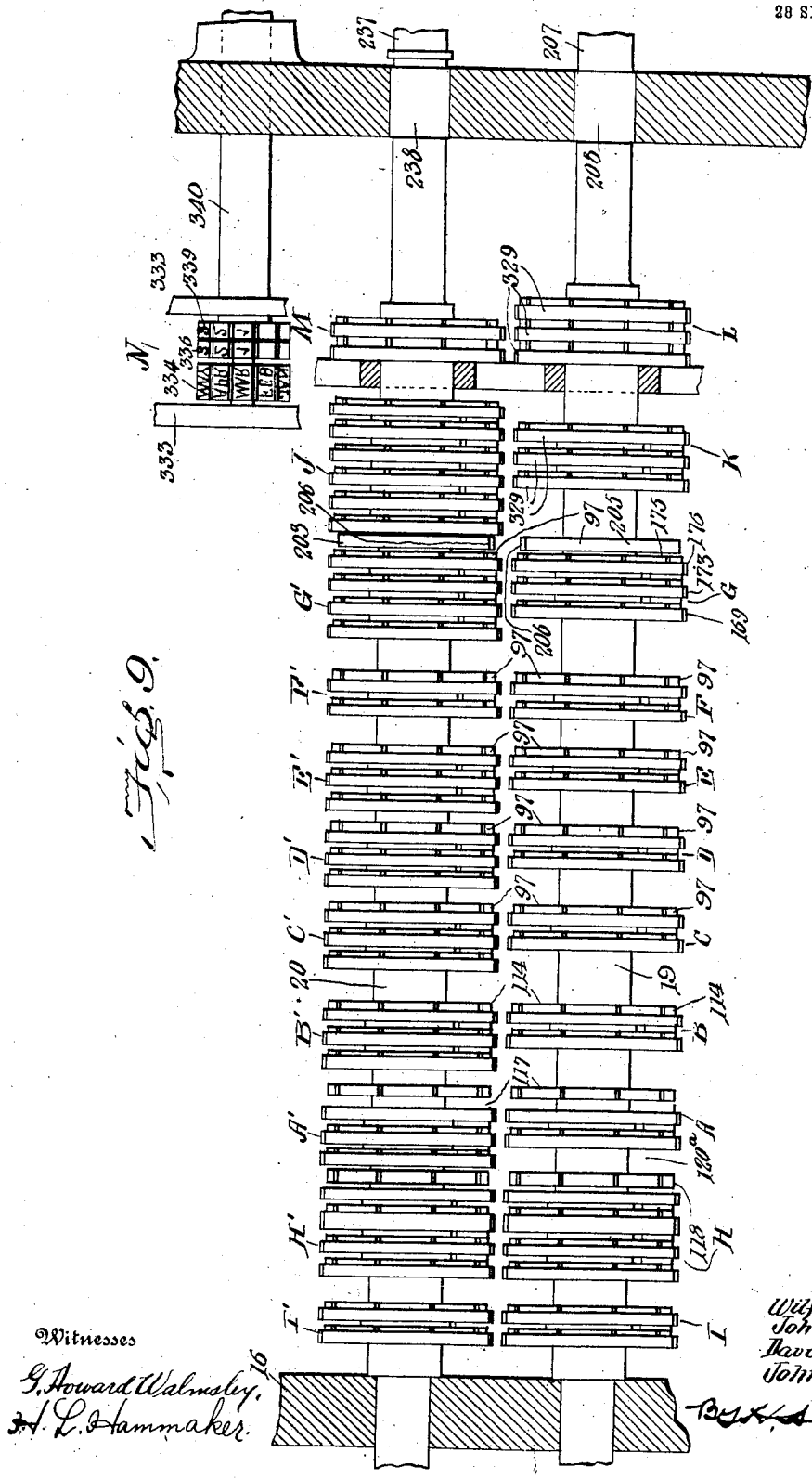
Figure 10:
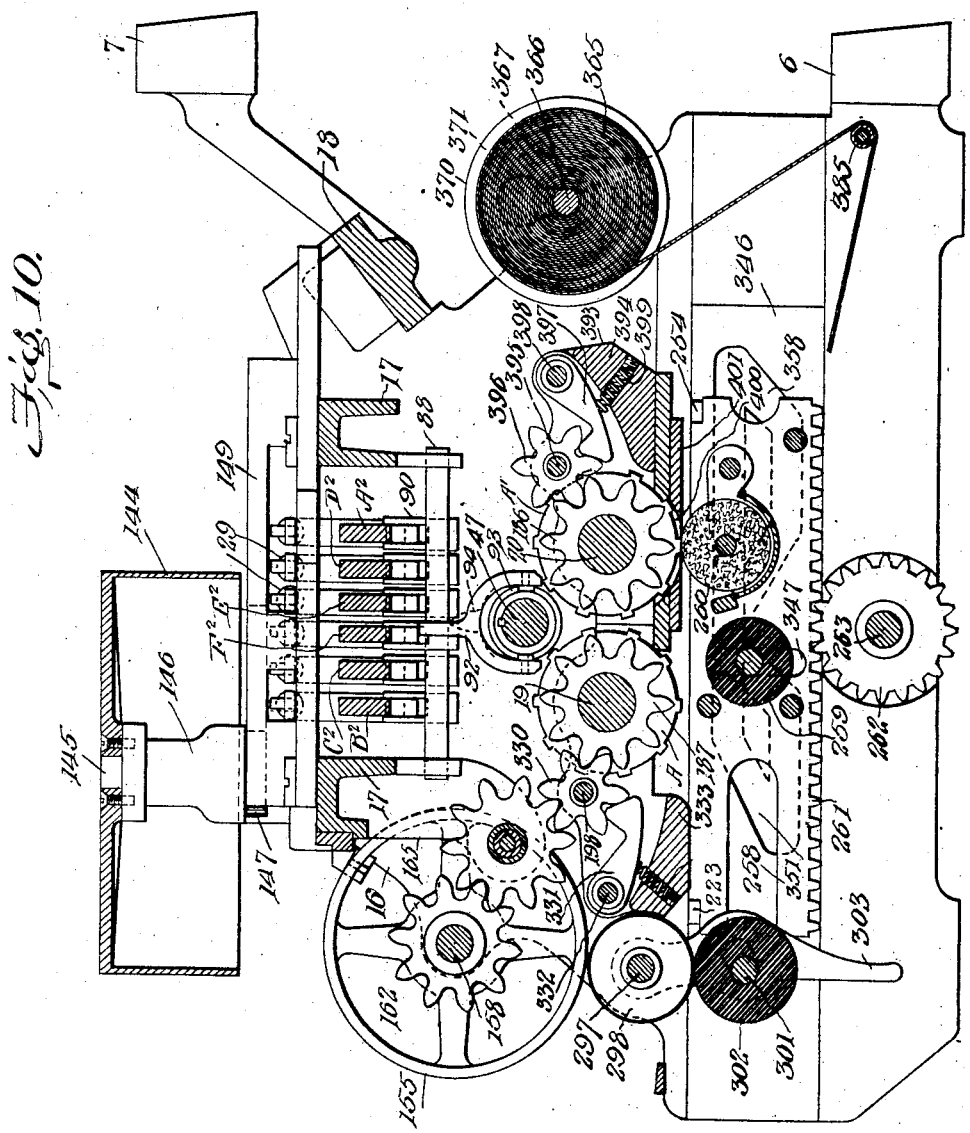
Figure 11:
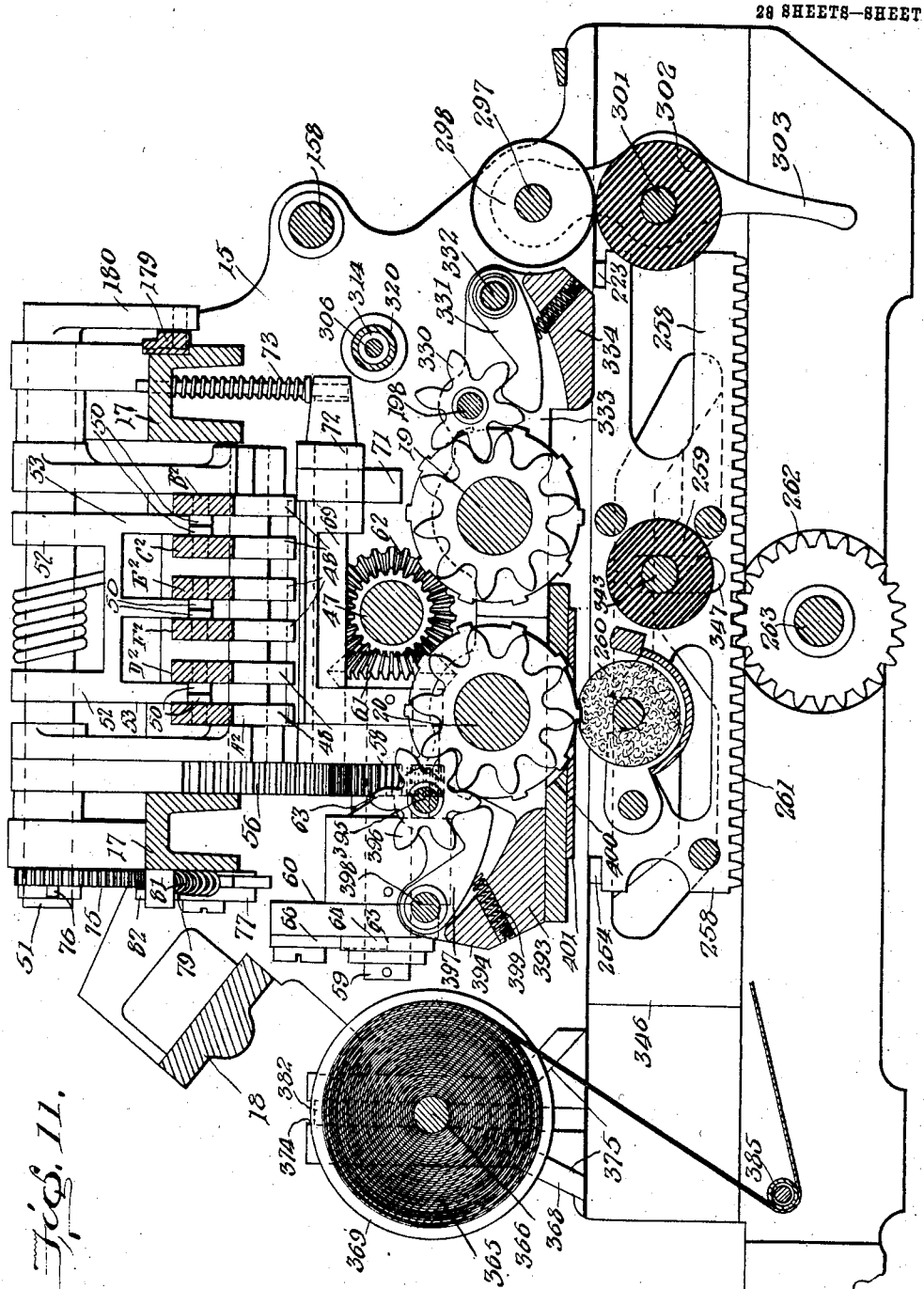
Figure 49:
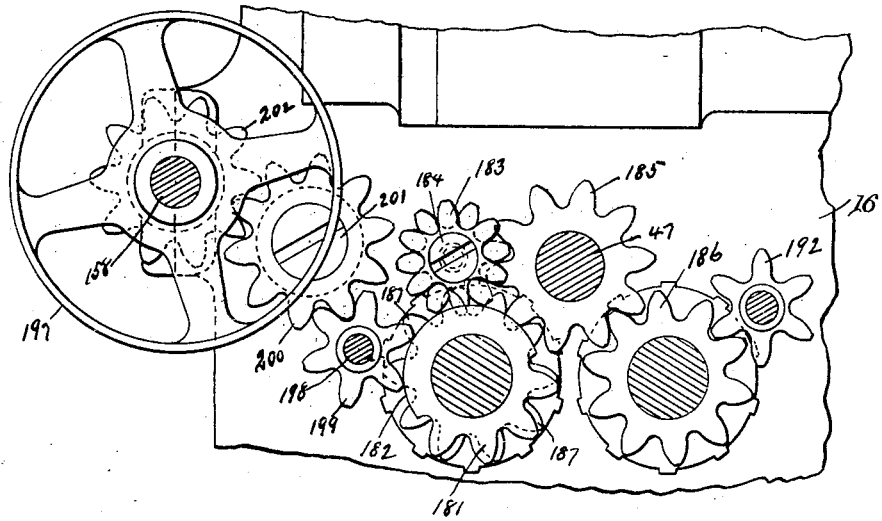
Figure 50:
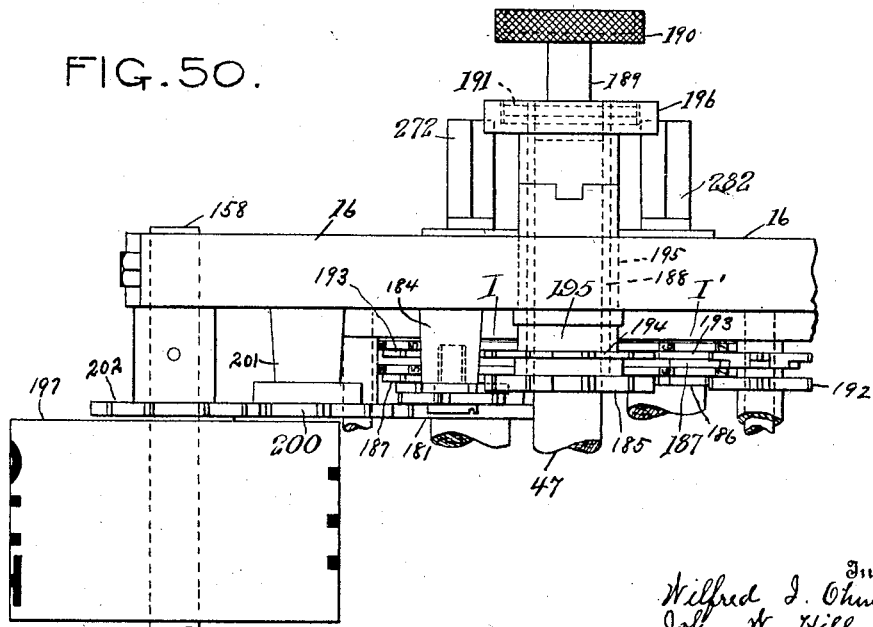
Figure 72:
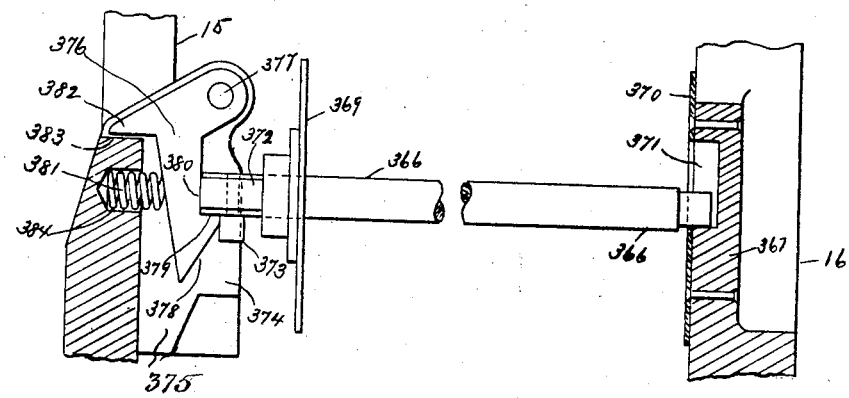
Figure 73:
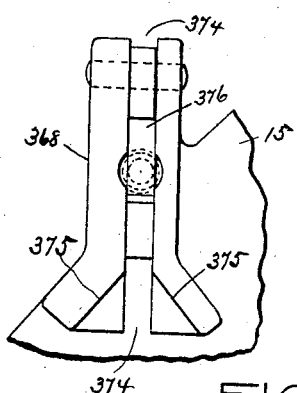
Figure 74:
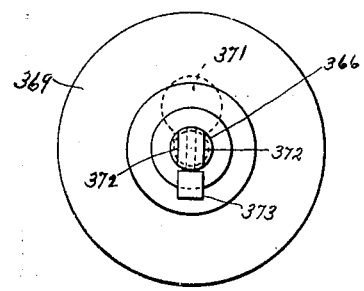
Figure 59:
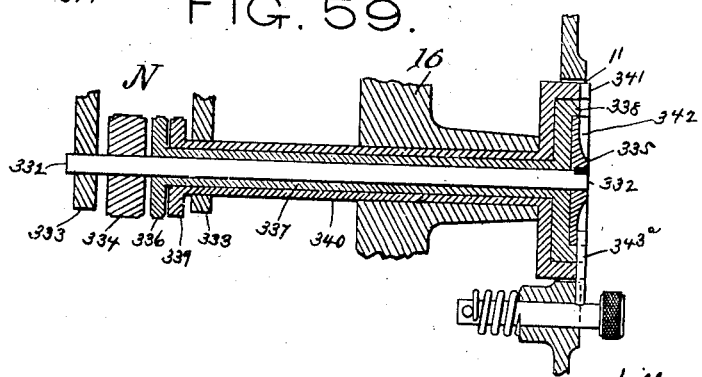
Figure 75:
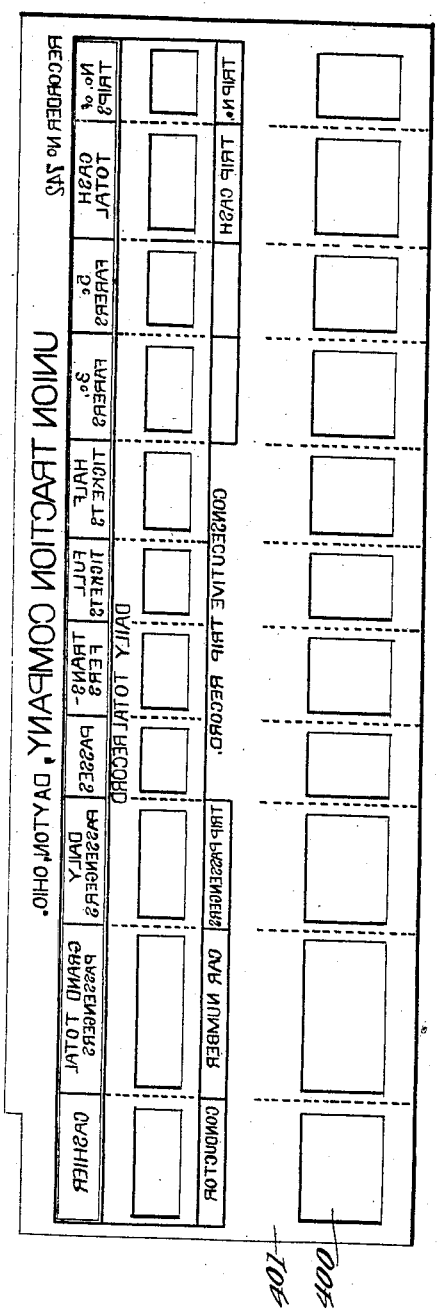

In the said drawings, Figure 1 is a front elevation of a machine embodying the invention in one form, the same being shown with the casing or cabinet in position thereon. Fig. 2 is an end view of the same. Fig. 3 is a front elevation with the casing removed, said casing being omitted in all of the following views except where otherwise specifically stated. Fig. 4 is a plan view. Fig. 5 is an elevation of one side or end. Fig. 6 is an elevation of the other side or end. Fig. 7 is a rear elevation. Fig. 8 is a detail front elevation of the upper portion of the machine with parts omitted, illustrating the counter-actuating mechanism. Fig. 9 is a top plan view of the counters and their resetting-shafts. Fig. 10 is a vertical sectional view taken in a plane from front to rear on the line *a a* of Fig. 4 and looking in the direction of the arrows. Fig. 11 is a similar view taken on the line *b b* of Fig. 4 and looking in the direction of the arrows—*i. e.*, in a direction opposite that in which Fig. 10 is viewed. Figs. 12 to 17, inclusive, are front elevations of the several slide-bars detached. Fig. 18 is an enlarged detail view in vertical section, taken on the line *c c* of Fig. 4 and looking in the direction of the arrows, illustrating the driving mechanism between the slide-bars ana actuating-shaft. Fig. 19 is a detail plan view of the drive-shaft and actuating-shaft, the same being taken on a plane corresponding with the line d d of Fig. 18 and looking in the direction of the arrows. Fig. 20 is a detail view in vertical section looking toward the front end of the drive-shaft. Fig. 21 is a similar view looking toward the rear end of the drive-shaft. Fig. 22 is a detail plan section illustrating the slide-bars and the cam-slide which actuates the fare-indicator. Fig. 23 is a detail view, partly in front elevation and partly in vertical section, of a part of one of the slide-bars. Fig. 24 is a detail sectional view taken on the line e e of Fig. 23 and looking in the direction of the arrows. Fig. 25 is a detail view in vertical section on the line f f of Fig. 26 and looking in the direction of the arrows, illustrating the rock-shafts intermediate the slide-bars and counter-actuating gears with their arms and yokes. Fig. 26 is a detail plan section taken on the line g g of Fig. 25 and looking in the direction of the arrows. Fig. 27 is a detail view of one of the rock-shaft arms detached. Fig. 28 is a sectional view of the same, taken on the line h h of Fig. 27 and looking in the direction of the arrows. Fig. 29 is a detail view, in transverse section, on a line corresponding with the line i i of Fig. 26, showing one of the arms engaged with its rack-bar. Fig. 30 is a detail view further illustrating such engagement. Fig. 31 is an enlarged detail view showing in front elevation the actuating-shaft, its gears, and the yokes and associated parts by which said gears are moved longitudinally of said shaft by the slide-bars. Fig. 32 is a detail sectional view taken on the line j j of Fig. 31 and looking in the direction of the arrows. Fig. 33 is a perspective view of the combination-gear or geared sleeve by which the cash-fare counters and cash-adding counters are actuated, detached. Fig. 34 is a view similar to Fig. 31, illustrating a modification of this portion of the mechanism. Fig. 35 is a detail sectional view taken on the line k k of Fig. 34 and looking in the direction of the arrows. Fig. 36 is a face view of one of the yokes detached. Fig. 37 is a similar view of another one of the yokes. Fig. 38 is a view of the actuating-gear for the five-cent fare. Fig. 39 is a similar view of the actuating-gear for the three-cent fare. Fig. 40 is a detail end elevation illustrating the slide-bar-locking mechanism and also the interlocking mechanism by which the operation of more than one slide-bar at a time is prevented. Fig. 41 is a detail sectional view taken on the line l l of Fig. 40 and looking in the direction of the arrows. Fig. 42 is a detail sectional view taken on the line m m of Fig. 41 and looking in the direction of the arrows. Fig. 43 is a similar view taken on the line n n of Fig. 41 and looking in the direction of the arrows. Fig. 44 is a detail plan view of the interlocking mechanism between the actuating and resetting shafts. Fig. 45 is an elevation of the same. Fig. 46 is a view illustrating in elevation the mechanism for operating the passenger-indicating wheel. Fig. 47 is a plan view of the same, partly in horizontal section. Fig. 48 is a detail view, in horizontal section, of a portion of Fig. 47. Fig. 49 is a detail view in elevation of the mechanism for operating the trip-indicating wheel and for operating and setting the trip-number-printing wheels. Fig. 50 is a plan view of the same. Figs. 51 and 52 are views of the grand-total passenger-counter and its operating mechanism. Fig. 53 is a plan section with the casing in position, illustrating the car-number-printing wheels and their operating mechanism. Fig. 54 is a horizontal sectional view of the same. Figs. 55, 56, and 57 are detail sectional views of the external operating-wheels detached. Fig. 58 is a face view of these wheels assembled. Fig. 59 is a detail sectional view of the date-printing mechanism. Fig. 60 is a face view of one of the cam-track plates of the printing mechanism. Fig. 61 is a sectional view of the same, taken on the line o o of Fig. 60 and looking in the direction of the arrows. Fig. 62 is a similar view taken on the line p p of Fig. 60 and looking in the direction of the arrows. Fig. 63 is a similar view taken on the line q q of Fig. 60 and looking in the direction of the arrows. Fig. 64 is a similar view taken on the line r r of Fig. 60 and looking in the direction of the arrows. Fig. 65 is a detail view, partly in section, of one end of the impression-roller. Figs. 66 and 67 are detail views of the bell and its mechanism. Fig. 68 is a detail view of the barrel for the conductor's key detached. Fig. 69 is a similar view of the conductor's key. Figs. 70 and 71 are similar views of the barrel for the cashier's key and the cashier's key. Figs. 72, 73, and 74 are detail views illustrating the paper-roll-holding mechanism. Fig. 75 is a view of the printing-plate detached, and Fig. 76 is a view of a record such as is produced by the machine.

Referring to the said drawings, it will be seen that the machine comprises an outer casing or cabinet 1, having suitable sight-openings 2 in its face, through which the fare-indicator, trip-indicator, and passenger-indicator are visible, the machine-number being also displayed, as indicated at 3. This cabinet has a door 4, controlled by a lock 5, to give access to the interior thereof when it is desired to withdraw the record-sheet at the end of the day or at other times for other purposes. At the back of the cabinet the supporting-brackets 6 and 7 extend through the same, and the bell 8 is also there located externally, its support extending through the casing. At one end or side said cabinet has an aperture for the trip-resetting shaft and its indicating disks or dials, hereinafter referred to, and openings for the resetting-shafts. At the other end or side said cabinet has an opening 9 for the passage of the slide-bars, an opening 10 for the setting and indicating disks or dials of the car-number-printing wheels, a similar opening 11 for the setting and indicating disks or dials of the date-printing wheels, openings 12 and 13 for the barrels of the conductor's and cashier's keys, respectively, and an opening 14 for the end of the printing-shaft. This cabinet is removable, and in the figures of the drawings other than Figs. 1 and 2 it has been omitted, except in one or two instances, where a portion thereof is shown.

The machine proper comprises a frame on which the various mechanisms are mounted. This frame comprises two side members 15 and 16, connected at the top by a bridge-piece 17, and further connected by a cross-bar 18 at the rear. It may be here stated that the brackets 6 are formed on the members 15 and 16, while the bracket 7 is formed on the cross-bar 18, said brackets serving to removably support the machine in position on the car-wall or other suitable support.

Between the frame members 15 and 16 are rotatably mounted two parallel shafts 19 and 20, which constitute supporting-shafts for two rows of printing-wheels. These printing-wheels comprise two duplicate groups or rows of printing-counters, for which the shafts serve as resetting-shafts to reset the counters of the respective groups to zero and also certain other groups of printing-wheels. Referring to Fig. 9 of the drawings, in which these printing-wheels are shown in position, the front shaft 19 has mounted thereon a series of printing-counters, six in number in the present instance, for printing the number of fares of different species received on each trip. These counters in the present construction and arrangement are the five-cent-fare counter A, the three-cent-fare counter B, the half-ticket-fare counter C, the whole-ticket-fare counter D, the transfer-fare counter E, and the pass-fare counter F. In addition to these counters there are mounted on the front shaft 19 a trip-total passenger-counter G and a trip-total cash-counter H, the former of which is actuated each time any one of the specific-fare counters is actuated, while the latter is actuated each time either one of the two specific-cash fare counters, five or three cent, is actuated, and to a corresponding extent. All of these counters reset to zero when the shaft 19 is given one complete revolution. Any approved construction may be employed for this purpose, that preferred being set forth in an application filed by Albert J. Kirchner April 30, 1906, and assigned to The Recording and Computing Machines Company, the same permitting rotation of the resetting-shaft in one direction only. The rear shaft 20 has mounted thereon a corresponding series of printing-counters (indicated by the reference characters from A' to H', inclusive) which print the daily totals of the same six specific fares, the number of passengers, and the amount of cash received. The counters are alined with the corresponding counters of the front shaft with the driving-gears of their primary wheels in the same plane as those of the front counters, so that a single actuating-gear located between each pair of front and rear counters serves to actuate them both when it revolves. The counters referred to on the rear shaft 20 are reset to zero when said shaft is given one complete revolution in the same way as those of the front shaft. There is also mounted on the front shaft a consecutive-trip-number-printing counter I, while a similar printing-counter I' is mounted on the rear shaft 20, these counters being located on said shafts near the frame member 16. They are so mounted and geared, as hereinafter set forth, that both are actuated to advance one unit when the shaft 19 is given a complete rotation, while both are reset to their prime position to print the numeral "1" when the shaft 20 is given a complete rotation. Provision is also made, as hereinafter set forth, to set both of these counters to print any desired number.

The rear shaft 20 supports, without resetting, a grand-total-passenger-printing counter J, while the front shaft 19 supports a group of car-number-printing wheels K, set in the manner hereinafter described. Alined with the counters of the front shaft is a group of printing-wheels L, controlled by the conductor's key and serving to print his identifying-number, while a similar group of printing-wheels M, controlled by the cashier's key, is alined with the counters of the rear shaft 20 and serves to print the cashiers identifying-number. These identifying devices are constructed in accordance with United States Letters Patent No. 797,598, granted August 22, 1905, to The Recording and Computing Machines Company as assignee of Wilfred I. Ohmer.

The several counters are of any approved construction, preferably in accordance with the Kirchner application hereinbefore referred to.

Proceeding now to a description of the mechanism by which the several fare-counters are actuated, it will be noted that there are provided slide-bars corresponding in number with the specific fares provided for, six being shown in the present instance, (indicated, respectively, by the reference characters from $A^2$ to $F^2$,) and operating, respectively, the several specific fare-counters A A', B B', C C', D D', and F F'. These slide-bars are separately shown in Figs. 12 to 17, inclusive, of the drawings. It will be noted that they are arranged in a horizontal plane instead of one above another vertically, as in the prior Letters Patent No. 764,494, hereinbefore referred to, thereby greatly diminishing the height and bulk of the machine, giving superior compactness and lightness. These slide-bars are supported to slide horizontally transversely of the machine, the construction preferred for the purpose being that shown, in which the bars are supported at one end by guides consisting of a cross-piece 21, extending across the tops or upper edges of the slide-bars and having spacing projections 22 extending down between said bars to guide them laterally, while a bottom cross-piece 23 supports them from below. At its other end each bar is supported between antifriction-rollers 24 above and similar rollers 25 below the same, as shown more particularly in Figs. 41 to 43 of the drawings, being guided laterally by passing through slots 26 in a guide-plate 27. Beyond this guide-plate the ends of the slide-bars extend out through the opening 9 in the cabinet and have their ends bent alternately upward and downward, as shown, to facilitate the attachment thereto of the operating mechanism. Links 28 are shown in Fig. 2, forming a part of this operating mechanism, for which application for Letters Patent will be made hereafter.

Each slide-bar is normally retracted or held in its home position by means of a spring 29, fastened at one end to the main frame and at the other end to the bar. These springs serve to hold the slide-bars with their ends against the frame member 16, which forms a stop to limit their movement in one direction. A simple and efficient connection between the spring and bar is shown particularly in Figs. 23 and 24 of the drawings, in which the end of the spring is secured to a head-block 30, which enters the same, said block having formed therewith a longitudinally-slotted link 31. A pin 32 is secured to the slide-bar by means of a saddle-piece 33 pinned thereto, and the upper end of this pin is flattened at the sides, as shown at 33ª, to receive the link 31, which fits thereon. The shoulders 34 at the ends of the flattened portions 33 keep the link from slipping down, and a removable pin 35 may be employed to hold the link down in position on the pin. This pin also serves to receive below said link the roller 36, which coöperates with the slide which controls the fare-indicating wheel in the manner hereinafter set forth. At its other end each spring 29 is threaded onto the inwardly-projecting end of a screw 37, which latter is threaded through a bracket 38. These screws serve in an obvious manner to not only secure the ends of the springs, but also effect the adjustment of their tension.

Provision is made for preventing the operation of more than one slide-bar at a time, the construction being such that as soon as any one slide-bar starts to move all of the other slide-bars are locked against movement. This interlocking system is illustrated more particularly in Figs. 40 to 42, inclusive, of the drawings. To this end the plate 27 has formed therein a guideway 39, extending transversely above the slide-bars, the upper edges of which latter extend into said guideway 39 for about half its diameter, said slide-bars being each provided with a notch or recess 40, which coincides with the said guideway 39 when the slide-bars are in their normal or home position. In the guideway 39 there is located a plurality of balls 41, fitting therein and being one less in number than the slide-bars, five in the present instance, while their diameter is substantially equal to the width of a slide-bar plus the space which separates it from the adjacent slide-bar. The length of the guideway 39 is equal to the combined diameter of the five balls plus the width of one slide-bar. In the present instance this length is shown as regulated by a screw 42, which closes one end of the guideway and which is removable to permit the insertion and removal of the balls. From an inspection of Fig. 42 it will be seen that the additional space in the length of the guideway 39 over and above the space occupied by the balls when in contact with each other is just sufficient to permit one of the slide-bars to move longitudinally, and by this action the upper edge of the moving slide-bar fills the said additional space in such a way as to prevent any movement of the balls, which by their engagement with the notches 40 of the remaining slide-bars positively prevent any movement thereof. It is preferred to give to the portion of the wall of the notch 40 which serves to crowd the balls to one side or the other the wedge or V shape indicated at 43, so as to insure a prompt displacement of the balls when the bar starts to move. Provision is also made for directly locking all of the slide-bars against any movement whatever except when the conductor's identifying-key is in position, as hereinafter set forth, and to this end there is provided a locking-bolt or plate 44, which slides vertically in guides 45 on the outer face of the plate 27, this locking-bolt being operated by the mechanism hereinafter set forth. Each slide-bar is provided on its under face with a locking notch or recess 46, and when the slide-bars are in their home or normal position these locking-notches are alined in such a way as to receive the locking bolt or plate 44, which latter when it engages them positively holds all of the slide-bars against any movement whatever.

Mounted between the counter supporting and resetting shafts 19 and 20 is an actuating-shaft 47, arranged parallel therewith, and preferably somewhat above the same. This actuating-shaft carries the several actuating members or gears which actuate the specific-fare and cash counters, as well as the actuating members or gears which actuate the passenger-counters. It is the function of the slide-bars, hereinbefore described, when actuated by full reciprocation or in-and-out movement to impart to this actuating-shaft one complete revolution. At the same time it is the function of each slide-bar upon such movement to establish operative relations between the specific-fare counters to which said slide-bar relates and the particular actuating member on the actuating-shaft which serves to actuate said counter. In the case of the cash-fare slide-bars A² and B² in the present instance this movement also serves to bring into operative relation with the cash-adding counters the actuating-gears necessary to add thereon the particular cash fare in question. As to the first of these functions—to wit, the imparting of a single complete rotation to the actuating-shaft 47—the structural features of the several slide-bars are identical; and they all operate through a common mechanism, which structural features and mechanism will be now described.

Each slide-bar has extending downward from its lower edge a projection 48, and said lower edge is preferably recessed or cut away immediately in front of said projection, as shown at 49. Each slide-bar is further provided on one of its sides with a laterally-projecting pin 50. A rock-shaft 51, supported in bearings 52 from the bridge-piece 17, has extending downward therefrom on each side of the group of slide-bars an arm 53, said arms being rigidly secured to said rock-shaft at their upper ends, while their lower ends are connected by a contact-bar 54, which lies in the path of the projections 48 of the slide-bars. It will thus be seen that the outward motion of a slide-bar will cause its projection 48 to engage the contact-bar 54 and, through the arms 53, impart a movement of oscillation to the rock-shaft 51 in one direction. The rock-shaft 51 is further provided with arms 55, which extend down between the slide-bars in the same vertical plane as the pins 50. From an inspection of Fig. 18 it will be seen that the relation of the pins 50 and arms 55 is such that during the first or initial portion of the outward movement of the slide-bar the pin 50 passes under and outward beyond the lower end of the corresponding arm 55. As the slide-bar continues to move outward, however, and the rock-shaft 51 turns, the lower end of the arm 55 moves farther downward, so that it extends below and lies in the path of the pin, in which position it is during the return movement of the slide-bar. During this return movement, therefore, the pin engages the arm, and thereby positively oscillates the rock-shaft 51 in the opposite or return direction until it reaches its normal position, whereupon the arm 55 has risen clear of the pin 50, and the latter passes beyond the same until the slide-bar reaches its home position. It will be noted that the arrangement of the parts is such as to permit some outward movement of the slide-bar before the projection 48 engages the contact-bar 54 and the movement of the rock-shaft 51 begins. This preliminary movement of the slide-bar is utilized to bring the actuating-gear into operative position on the actuating-shaft, as hereinafter set forth, before the rotary movement of said shaft begins, said shaft being driven from the rock-shaft 51. The rock-shaft 51 is provided to this end with a gear-segment 56, secured thereon and meshing with a spur gear or pinion 58 on a shaft 59, extending from front to rear of the machine, and which may conveniently be termed the "drive-shaft." The shaft 59 is mounted in bearings 60 on the inner face of the side frame member 15. It is provided at its front end with a bevel-gear 61, which meshes with a bevel-gear 62, secured on the actuating-shaft 47 and imparting motion to this latter. Since the movement of the rock-shaft 51 and gear-segment 56 is one of oscillation, while the movement to be imparted to the actuating-shaft 47 is one of intermittent rotation in a fixed direction, the gear 58 is not rigidly secured to the shaft 59, but is connected thereto by a ratchet-clutch 63, so that the shaft 59 turns with the gear in one direction, but remains stationary when the gear is moving in the opposite direction. This movement of the shaft 59 is to the extent of one complete rotation, and to prevent any possible movement of the shaft in the opposite direction there is secured on the rear end of said shaft a collar 64, having a peripheral detent notch or shoulder 65, which is engaged by a spring-controlled pawl 66, mounted on one of the bearing-brackets 60. Provision is also made for preventing overthrow or rotation of the drive-shaft 59 beyond a single complete revolution. For this purpose there is secured on said shaft, preferably adjacent to the bevel-gear 61, a collar 67, the periphery of which is formed into a stop-cam terminating in a radial stop-shoulder 68. A rock-shaft 69 is mounted in one of the bearing-brackets 60 at one end and in a bearing-bracket 70 on the inner face of the side frame member 15 at its other end. This rock-shaft is provided with a stop-arm 71, which lies normally in the path of the stop-shoulder 68 and prevents any revolution of the shaft 59 beyond the point of engagement of said shoulder and arm. In order to permit the disengagement of said stop-arm from said shoulder at the beginning of the movement of the parts to permit the shaft 59 to be rotated, the rock-shaft 69 carries a trip-plate 72, which extends across the space below the slide-bars in the path of their projections 48, being so arranged relatively to said projections that when a slide-bar starts outward it depresses the trip-plate and rotates the rock-shaft 69 in such a way as to lift the stop-arm 71 out of the path of the stop-shoulder 68. After the shaft 59 has started to rotate it continues to do so until the stop-shoulder again comes into contact with the stop-arm, which latter is held in the path thereof by means of a spring 73, connected to an arm 74 on the front end of the rock-shaft 69.

Provision is also made for insuring a full stroke of each slide-bar after it is once started to move, so that it must be pulled clear out to give a complete actuation to all of the mechanisms controlled thereby before it can return to its normal position and permit the operation of another slide-bar. This full-stroke mechanism is shown more particularly in Figs. 4 and 7. The rock-shaft 51 is provided at its rear end with a ratchet-toothed segment 75, the teeth whereof are V-shaped teeth having equally-inclined sides. Said segment has at each end a trip-pin 76 projecting from its rear surface. A locking-pawl 77 is pivoted on the rear of the bridge-piece 17 and is provided with two teeth 78 and 79, either one of which may be brought into engagement with the teeth of the ratchet-segment 75, their arrangement being such that when the tooth 78 is in engagement the segment can move in one direction only, and when the tooth 79 is in engagement the segment can move in the opposite direction only. The pawl is held in either one of its two engaging positions by means of a pivoted pressure-arm 80, adapted to bear against one or the other of the angularly-arranged sides of the lower end of the pawl, the spring being indicated at 81. The position of the parts shown is the normal position before the slide-bar has begun to move outward, and when the slide-bar oscillates the rock-shaft 51 in one direction the tooth 78 of the pawl will yield sufficiently, the pawl and pressure-arm turning slightly on their pivots to permit the rotation of said rock-shaft and the movement of the slide-bar in the proper direction, while the tooth 78 positively prevents the rock-shaft from turning in the opposite direction, and consequently also prevents any backward movement of the slide-bar. This condition of affairs continues until the slide-bar has reached the limit of its outward motion. When this occurs, a projection or tailpiece 82, which extends from the pawl 77 over the rear face of the segment 75, is struck by the trip-pin 76 at one end of the segment, and the pawl 77 is reversed or swung over so far as to disengage the tooth 78 and engage the tooth 79, the pressure-arm yielding to permit the passage of the apex of the pawl and bearing upon the opposite side thereof to hold the tooth 79 in engagement. With the parts in this position the rock-shaft 51 and the slide-bar are free to move in the opposite direction and in that direction only and are returned to their normal position by means of the associated spring 29. It will be observed in this connection that a single full-stroke mechanism controls all of the slide-bars, and the separate mechanism heretofore employed for each slide-bar is dispensed with.

Having now described the mechanism whereby each slide-bar when actuated imparts a complete movement of rotation to the actuating-shaft 47, reference will now be made to the means by which each slide-bar effects the operation of the corresponding specific-fare counters. In this connection it may be stated that while the mechanism may be substantially identical in the case of each slide-bar and its counters, and is so disclosed in a modification illustrated and hereinafter described, the preferred form of construction for simplicity and compactness' sake consolidates to a certain extent the operative mechanisms controlled by the two slide-bars relating to specific cash fares—to wit, the five-cent cash-fare slide-bar $A^2$ and the three-cent cash-fare slide-bar $B^2$. The remaining slide-bars and the mechanisms controlled thereby are substantially identical, differing only in arrangement, and these latter will be first described. Each of these slide-bars is provided in its lower edge with a cam-surface comprising a notch or recess 83, the wall of which comprises an incline 84, which connects the deepest portion or top of the recess with a flat or horizontal surface 85 on the under edge of the slide-bar. On the side of the recess 83 opposite that on which the surface 85 is located there is provided a hook-like cam projection 86, having its extremity, which extends over the recess toward the surface 85, beveled or inclined, as indicated at 87. These recesses and their coöperating parts are located at different points along the slide-bars under consideration, as shown in Figs. 12 to 15, inclusive, of the drawings. Coöperating with each of these four slide-bars is a rock-shaft 88, these rock-shafts being shown as mounted in brackets 89, depending from the bridge-piece 17, said rock-shafts extending in a direction from front to rear of the machine and transversely to the slide-bars below the same. Each rock-shaft has secured thereon an arm 90, arranged immediately below and in vertical alinement with the slide-bar with which it coöperates, said arm being preferably provided at its free upper extremity with an antifriction-roller 91. When the parts are in normal position, these rollers rest in corresponding recesses 83, being held therein by the hook-like projections 86, which engage under the rollers. In addition each rock-shaft is provided at its central portion with a yoke 92, extending downward therefrom and straddling the actuating-shaft 47. Each yoke is adapted to engage a groove 93 in the sleeve-like hub of an actuating member or gear 94, splined on the actuating-shaft 47, so as to rotate in unison therewith, but move longitudinally with respect thereto. Preferably the yoke is provided with pins 95, engaging said groove and carrying antifriction-rollers. Stop-pins 96 project from the shaft 47 and limit the movement of the gears upon the shaft. Each of the four counters C, D, E, and F of the front group and the corresponding counters C', D', E', and F' of the rear group has its units or primary wheel provided with a driving-gear 97, these driving-gears lying in the same vertical plane, and the normal position of the teeth of the gears 94 are at one side of said plane beyond the limits of the corresponding counters. Thus from an examination of Fig. 8 it will be seen that the members 94, which are single or one-tooth gears, register when in normal position with the spaces between the counters, and consequently do not operate their counters when the actuating-shaft 47 is rotated. Assuming, however, that one of the four slide-bars under consideration—for instance, the slide-bar C²—is actuated. As soon as this slide-bar begins its outward movement and before the actuating-shaft begins to rotate the incline 84, acting on the roller 91, forces the arm 90 downward and moves the corresponding rock-shaft 88 in one direction. This imparts motion in one direction to the yoke 92 of said rock-shaft, which by reason of its engagement with the groove 93 of the sleeve or hub of the corresponding gear-tooth 94 moves said gear or gear-tooth over to the left in Fig. 8 until it lies in the same plane as the gears 97 of the counters C and C'. This occurs when the roller 91 has passed clear of the incline 84 and entirely out of the recess 83 and is bearing upon the flat surface 85, while at the same time the end of the sleeve or hub of said gear 94 is firmly held against the stop-pin 96, which limits its movement to the left, being so held by reason of the contact of the roller 91 with the surface 85 of the slide-bar. It will thus be seen that the particular actuating-gear 94 of the counters C and C', in the present instance the specific-fare counters relating to half-tickets, is firmly held in such a position that as the further outward movement of the slide-bar C² imparts a single complete revolution to the actuating-shaft 47 in the manner hereinafter described said gear-tooth 94 will successively engage the gears 97 of the counters C and C' and will so actuate them as to add one upon each counter. When the actuating-shaft 47 has completed its rotation and the slide-bar C² starts on its return journey, the parts referred to remain stationary as long as the flat surface 85 of the slide-bar is traveling over the roller 91. When the recess 83 reaches said roller, the cam projection 86 inserts its inclined extremity 87 under the roller and forces the same positively up into the recess 83, thereby restoring the parts to normal position and holding them in that position until said slide-bar is again operated. It will be understood, of course, that only that one of the members 94 which is shifted into working relation to its coöperating counters accomplishes any useful work when the actuating-shaft revolves, the other gears 94 not being in position to mesh with their counters as they rotate. The construction described has the advantage that it is positive in its operation and dispenses with the use of springs for moving in either direction the gear-wheels and the mechanism intermediate said wheels and the rack-bars.

Referring now to the rack-bars A² and B², which actuate the cash-fare counters A A' and B B', it will be observed that the former, which operates the five-cent-fare counters, has a relatively deep notch or recess 98 in its under side and a relatively long incline 99, terminating in a flat surface 100. The slide-bar B² has a relatively short incline 101, terminating in a flat surface 102. This recess and these inclines are arranged on the corresponding parts of the slide-bars, with which coöperates a single rock-shaft 103, similar to the rock-shafts 88 and similarly mounted and arranged. This rock-shaft has, however, two arms, one of which, 104, engages under the slide-bar A² at the rear of the machine, while the other, 105, engages under the slide-bar B² at the front of the machine. These arms are provided with antifriction-rollers 106, corresponding to the antifriction-rollers 91 of the arms 90 and lying against the inclines 99 and 101, respectively, when in normal position. No parts corresponding to the cam projections 86 are employed in this case, however, as the parts are spring-controlled, as will hereinafter appear. The rock-shaft 103 has a central yoke 107, provided with pins 108 to engage a circumferential groove 109 in a sleeve 110, splined on the actuating-shaft 47, so as to rotate therewith and move longitudinally thereof. This sleeve 110 is practically a consolidation of the four gears which operate the specific cash-fare counters and cash-adding counters, which are formed thereon or secured thereto. The sleeve 110 is normally held against the stop-pin 96 at its right-hand end by means of a spring 111, coiled around the shaft 47 and bearing at one end against the sleeve 110, its other end bearing against an abutment-collar 112, secured on said shaft. The sleeve 110 is capable of three different positions, of which the normal position just referred to may be considered as the first. The second position is that in which it is moved one step to the left in Fig. 8 from the normal position. This movement is accomplished by the slide-bar B² with its short incline 101, which moves the rock-shaft 103 to a relatively small extent. The third position is when the sleeve 110 is moved two steps to the left from the normal position, (shown in Fig. 8,) which movement is accomplished by the relatively long incline 99 of the slide-bar A². 113 indicates the gear which actuates the three-cent-fare counters B and B', the same being normally in a plane passing through the spaces between the counters B and C on one side and B' and C' on the other side. The counters B and B' have their units or primary wheels each provided with an actuating or driving gear 114, offset therefrom, so as to leave between said driving-gear and the body of the counter a space 115 of a width sufficient to permit free passage to the gear or tooth 113. The driving-gears 114 are so located that when the slide-bar B² moves the sleeve 110 one step to the left in Fig. 8 the gear 113 will be in the same plane as the driving-gears 114 and will mesh therewith when the shaft 47 is rotated, thereby adding one on the counters B and B'. When, however, the slide-bar A² is actuated and the sleeve 110 is moved two steps to the left in Fig. 8, then the gear 113 registers with the spaces 115 on each side and does not actuate its counters when the shaft is rotated. The sleeve 110 also carries the one-tooth gear 116, which operates the five-cent-fare counters A and A', said tooth being set so far to the right of the driving-gears 117, carried by the units-wheels of said counters that when the sleeve 110 is moved one step to the left in Fig. 8 by the slide-bar B² the tooth 116 still remains to the right of the plane of the driving-gears 117; but when the slide-bar A² moves the sleeve 110 two steps to the right in Fig. 8 then the tooth 116 is moved into and held in the plane of the driving-gears 117, and the rotation of the shaft 47 causes it to add one on the counters A and A'.

The units-wheels of the cash-adding counters H and H' have their driving-gears 118 laterally offset to leave a space 119 between each gear and its wheel. A space 120ᵃ is also left between each driving-wheel 118 and the adjacent counter A or A'. The sleeve 110 is provided at its end with a three-tooth gear 120 and a five-tooth gear 121 immediately adjacent to each other, said gears lying normally opposite the spaces 120ᵃ, so that rotation of the shaft 47 does not cause said gears to produce any effect. When the sleeve 110 is moved one step to the left in Fig. 8 by the slide-bar B², the three-tooth gear 120 is moved into position to mesh with the driving-gears 118, so that rotation of the shaft 47 will add three upon both of the cash-counters H and H'. When the sleeve 110 is moved two steps to the left in Fig. 8 by the slide-bar A², the three-tooth gear 120 rotates opposite the blank spaces 119, but the five-tooth gear 121 is in the same plane with and meshes with the driving-gears 118 and adds five on the cash-counters H and H'. It will thus be seen that the operative movement of each slide-bar not only imparts a movement of rotation to the actuating-shaft 47, but also serves to establish the necesssary driving connection between the actuating member which it controls and the two counters which relate to the particular fare in connection with which the slide-bar is used, so that the rotation of the shaft will add the necessary amount upon the counters.

It is obvious that instead of being splined upon the actuating-shaft so as to always rotate in unison therewith the actuating-gears may be loose on said shaft and may be connected therewith to actuate their counters by means of a suitable clutch mechanism. Such a modification is illustrated in Figs. 34 to 39, inclusive, of the drawings in a form in which the gears, while loose on the shaft are moved longitudinally thereof into engagement with fixed clutch members on said shaft. In this construction the actuating-shaft is indicated by the reference-numeral 122 and has secured thereon clutch members 123, corresponding in number with the actuating-gears, which are six in the present instance. Each actuating-gear is provided with a corresponding clutch member 124 and is loosely mounted on the shaft 122 and provided with a hub or sleeve 125, having a groove 126. In each groove fit the arms of a yoke 127, these yokes being centrally secured to rock-shafts 128, which correspond with the rock-shafts 88 of the construction already described, said rock-shafts having arms 129 with rollers 130, corresponding with the arms 90 and rollers 91 of the preferred construction. It will be seen that when any given slide is operated the yoke of the corresponding rock-shaft will shift the corresponding actuating-gear longitudinally on the shaft, so as to move it into a position where its clutch member will engage the corresponding fixed clutch member on the shaft, thereby causing the gear to rotate in unison with the shaft. The gears are held against rotation or displacement when not in operation by means of pins or projections 131 on the corresponding yokes, these pins lying on opposite sides of the gear-teeth when the gears are unclutched, so as so hold the gears stationary. When any yoke is moved to bring its gear into clutched connection with the shaft, the change in the angular position of the yoke withdraws the pins from the path of the gear-tooth and permits the gear to revolve with the shaft.

It will be noted in this construction that the three-cent and five-cent actuating gears (indicated, respectively, by the reference-numerals 132 and 133) are separate and independent and have separate and independent actuating rock-shafts. These gears have respectively three and five teeth, one tooth of each gear being a double tooth, to actuate the specific-fare counters, while all of the teeth actuate the cash-adding counters through the means of suitable intermediate gearing.

The counters G and G', which respectively relate to the total number of passengers on each trip and the total number of passengers on each day, are actuated each time the actuating-shaft 47 is rotated, their actuation being effected by means of a one-tooth gear 134, permanently secured on said shaft. Thus each time a fare of any kind is registered on the machine one is added to each of the counters G and G', which thus show the grand total of all of the fares of all kinds, being the total number of passengers registered.

The grand-total counter J, which is a counter which is not reset to zero, but adds continuously up to a high number, in the present instance one short of a million, is provided, as usual, as a check to prevent intentional overrunning of the remaining counters beyond their capacity to falsify the record, accomplishing its end by reason of the large capacity which it has, which practically prevents overrunning the same. This counter is shown in detail in Figs. 51 and 52 of the drawings. It is driven from the actuating-shaft 47 by means of a disk or gear 135, having a single tooth 136, which meshes with the driving-gear 137 of the units-wheel of the counter J. This driving-wheel has the inner ends of its teeth concave to fit the periphery of the disk or gear 135, so that the driving-gear and-counter wheel are locked against motion except when actuated by the tooth 136. The units-counter wheel (indicated by the numeral 138) has on its opposite side a one-tooth gear 139 similar to the disk-gear 135, and this one-tooth gear 139, through a gear 140, similar to the gear 137, drives the transfer-wheel 141, which latter in turn meshes with the driving-gear 142 of the tens-wheel 143 of the counter. A similar arrangement between the successive counter-wheels advances each one of them one step for each complete revolution of its predecessor, and it will be seen that the construction is such that the counter is positively locked except when actuating.

The fares collected and registered on the machine are indicated as registered by means of a fare-indicator, which is visible through one of the openings 2 in the cabnet. This fare-indicator consists of a wheel 144, mounted to revolve on a vertical axis, being secured to a shaft 145, which is mounted in a bearing-bracket 146, secured to the top of the bridge-piece 17. The shaft 145 is provided at its lower end with a pinion 147, which latter meshes with a rack 148, carried by a plate or slide 149, which is also mounted on top of the bridge-piece 17 and slides thereon transversely above the slide-bars. It is preferably guided by being provided with slots 150, through which pass guide-screws 151, provided with antifriction-rollers 152, which fit the slots 150. The slide 149 lies in the plane of the rollers 36, with which the slide-bars are provided, and said slide 149 has formed in said plane a V-shaped cam 153 composed of inclined surfaces converging in the direction of outward movement of the slide-bars and terminating in a recess or slot 154. The arrangement is such that when any given slide-bar is pulled outward its roller 36 comes into contact with one or the other of the inclined surfaces of the cam 153, and shifts the slide one way or the other until the recess or slot 154 is immediately above said rack-bar, the roller 36 entering said recess or slot, which it fits, and thereby firmly positioning the slide. This movement of the slide through the rack 148 and pinion 147 turns the shaft 145 and indicator-wheel 144 to a position such that the corresponding fare is shown by the indicator-wheel through the sight-opening at the front of the cabinet. The indicator-wheel remains in the position to which it has been moved until another slide-bar is actuated, whereupon the slide 149 is moved to the corresponding position and the part of the indicator-wheel showing the corresponding fare is moved into indicating position. There is also a passenger-indicator for the purpose of indicating the total number of passengers whose fares have been received and registered up to any given time on the trip. This consists, as usual, of three indicating-wheels 155, 156, and 157, which are visible through the corresponding sight-opening 2 in the cabinet. These wheels are mounted on a shaft 158, which rotates in suitable bearings 159 on the frame members 15 and 16. The wheel 157 is secured to, and rotates with the shaft 158; but the other wheels are loosely mounted thereon. The central wheel 156 is coupled to a sleeve 160, which surrounds the shaft 158, while the wheel 155 is coupled to a sleeve 161, which surrounds the sleeve 160. The shaft 158 has secured to it a gear 162, which therefore rotates in unison with the wheel 157. The sleeve 160 has secured to it a gear 163, which therefore rotates in unison with the wheel 156. The sleeve 161 has secured to it a gear 164, which therefore rotates in unison with the wheel 155. Mounted to rotate in bearing-brackets 165, supported from the bridge-piece 17, is a shaft 166, which has secured thereto a gear 167, which meshes with the gear 162. Said shaft 166 has also secured thereon near its other end a gear 168, which meshes with the transfer-gear 168$^a$ of the hundreds-wheel 169 of the trip-passenger counter G. Next to the gear 167 there is loosely mounted on the shaft 166 a gear 170, which meshes with the gear 163. This gear 170 has a sleeve-like hub 171, by means of which it is coupled to a gear 172, also loosely mounted on the shaft 166 and meshing with the transfer-wheel 172$^a$ of the tens-wheel 173 of the counter G. Finally, there is loosely mounted on the hub 171 of the gear 170 between it and the gear 172 a gear 174, which meshes with the gear 164 and also with an intermediate gear 174$^a$, which meshes with the driving-gear 175 of the units-wheel 176 of the counter G. It will thus be seen that each of the three indicator-wheels is positively connected by a direct train of gearing with the corresponding wheel of the passenger-printing counter G, so as to rotate in unison therewith. The indicator will therefore always show the number that the printing-counter has in printing position, and each time a fare is registered on the machine one will be added to the number shown by the indicator, while the indicator and counter reset to zero together.

In order to prevent overthrow or excessive movement of the indicator-wheels, a mechanism is employed which comprises inclined teeth 177 on one side of the periphery of each wheel, with which coöperate similarly-inclined teeth 178 on a bar 179, mounted in a suitable slideway on the front of the bridge-piece 17. The rock-shaft 51 is provided with an arm 180, which engages the slide-bar 179 and moves it over to the right in Figs. 3 and 4, so that the teeth 178 of the bar lie in the path of the teeth 177 of the wheels as these latter approach the end of their proper limit of motion, and thereby positively prevent said wheels from being beyond said limit. The inclination of the two sets of teeth enables those of the wheels to push those of the bar out of the way in case the bar should accidentally remain in the path of the wheel-teeth after they have accomplished their function and when power is applied to the indicator-wheels to positively operate them.

The trip-number-printing counters I and I' are not actuated from the actuating-shaft 47, but from the front or trip counter-shaft 19. This latter is rotated at the end of each trip to reset the counters thereon, and this rotation adds one on the trip-number-printing counters I and I'. To this end there is secured on the shaft 19 a mutilated gear 181, the untoothed portion whereof has a cylindric periphery 182. With this gear there meshes one member of a double gear 183, mounted on a stud-bearing 184, projecting inward from the frame member 16. The other member of the double gear 183 meshes with a gear 185, mounted loosely on the shaft 47 and meshing with the driving-gears 186 and 187 of the units-wheels of the counters I and I'. The gear 185 has its hub elongated into the form of a sleeve 188, which extends out through the frame member 16 and through the cabinet. Its outer end has secured to it the shank 189 of a knurled head or setting-knob 190, by means of which it may be rotated, and also has secured to it an indicating disk or ring 191, bearing on its face the numbers corresponding to those of the units-wheels of the counters I and I'. It will thus be seen that by reason of this construction the said counter-wheels may be turned to any desired position from the exterior of the cabinet, and their position will be at all times indicated there.

A transfer-wheel 192 transmits motion from the units-wheel 186 of the counter I' to the tens-wheel 193, and a gear 194, loosely mounted on the actuating-shaft 47, transmits motion from the counter-wheel 193 to the corresponding counter-wheel of the counter I. The gear 194 is mounted on a sleeve 195, which incloses the sleeve 188 and extends out through the frame member 16, having connected to its outer end a number-bearing indicating disk or ring 196, the face of which lies in the same plane with the indicating ring or disk 191. The numbers in printing position on the counters I and I' are thus always indicated on the disks 191 and 196. While the wheels of said counters are so geared together as to permit them to be set to print any desired number by means of the setting knob or wheel 190 alone, yet it is possible to set the tens-wheels independently by rotating the disk 196, if desired.

It will be understood that the counter I is so mounted on the shaft 19 that said shaft has no resetting functions in connection with said counter—simply adding one unit thereon when the shaft is rotated. The counter I', on the other hand, is so related to its shaft 20 that it is reset to its normal or original position when said shaft is rotated. Since the two counters are so geared together as to always move in unison, it will be at once seen that a rotation of shaft 19 will add one on both counters, while a rotation of shaft 20 will reset both counters to zero. Furthermore, both counters may be set to any desired position by turning the knob 190.

The gear 181 is also used to drive the trip-indicating wheel 197, which latter is loosely mounted on the shaft 158, in a position such as to be visible through the proper opening 2 in the cabinet. To this end there is mounted on the front transverse shaft 198 a gear 199, the teeth of which mesh with those of the gear 181 when in operation, but which bear upon the cylindric portion 182 of said gear between operations, thereby locking the gear-train of which the gear 199 forms a part against movement. The gear 199 also meshes with a gear 200, supported on a stud-bearing 201 from the frame member 16, and the gear 200 meshes with a gear 202, secured to the trip-indicator wheel 197. This latter may have upon its periphery any suitable legend—such, for example, as the words "In" and "Out"—to indicate the direction of the successive trips. It will be seen that each time that the resetting-shaft 19 is rotated to reset its counters at the end of a trip the indicator-wheel will be correspondingly actuated and moved into a position to indicate the direction of the trip. It will also be understood that at other times the trip-indicator wheel is firmly locked against movement by reason of the locking of its driving-gear train in the manner described.

Provision is made for so interlocking the counter-shafts 19 and 20 and the actuating-shaft 47 that the latter cannot be turned or operated unless the former are in their home or normal position, thus preventing any injury to the gearing or disarrangement of the mechanisms. The construction whereby this is effected is illustrated in detail in Figs. 44 and 45 of the drawings. In this construction there are secured on the three shafts 19, 20, and 47 three disks 203, 204, and 205. These disks are all arranged in the same plane and are of a diameter such that they would intersect each other if entire. Each disk is, however, cut away at its margin, as indicated at 206, to an extent such that when the cut-away portions are in proper position, which occurs when the corresponding shafts are in normal position, each disk is free to revolve by reason of the clearance provided by the cut-away portions of the other two disks. When, however, the actuating-shaft 47 is turned from normal position, then neither of the counter-shafts can be operated. Similarly it is necessary that the counter-shafts should be given a complete revolution in resetting the counters to zero, and if this is not done and either shaft is not returned to its normal position then the actuating-shaft cannot be rotated. Thus a full and complete rotation of both the actuating-shaft and the resetting-shafts is made necessary before the machine can be further operated.

The identifying and locking devices of which the groups of printing-wheels L and M form a part are, as hereinbefore stated, made in general accordance with United States Letters Patent No. 797,598. The present construction differs, however, from what is set forth in said Letters Patent, as will hereinafter appear. In an application filed by Wilfred I. Ohmer December 27, 1904, Serial No. 238,396, the identifying mechanism of Letters Patent No. 797,598 is set forth in connection with means for locking and unlocking the registering and printing portions of the machine. The present invention involves an improvement upon these features whereby the mechanism is not unlocked until the operator's key has been inserted and turned as far as it will go, so that the indicating device is bound to have the proper indicating characters in printing position when the mechanism is unlocked, and a further feature gained is that the mechanism becomes locked again as soon as a reverse movement of the key displaces the printing characters from the proper indicating position, so that the key cannot be used to print a record in any position except the correct one, in which the proper identifying characters of said key are in printing position, the machine being locked at all other times. Referring now to the details of this construction, the barrel of the conductor's key is indicated by the reference-numeral 207. It has a central bearing portion 208, which fits in a suitable bearing-aperture in the frame member 15. At its inner end it has a reduced portion 209, on which the identifying printing-wheels are mounted, and a journal portion 210, by which it is supported in a suitable bearing-bracket 211, the shoulder 212, between the parts 209 and 210 preventing longitudinal movement in one direction. At its other end it is held against longitudinal movement in the opposite direction by means of a plate 213, secured to the outer face of the frame member 15 and bearing against the shoulder 214 at the front end of the bearing-section 208 of the barrel. The conductor's key, which is indicated by the reference-numeral 215, has in addition to the selective projections 216 at its inner end a projection 217, which when the key is properly inserted in place and turned bears against the inner face of the frame member 15 and prevents the key from being withdrawn except from the one position which it assumes when inserted. The key is constructed of a width such as to make its edge generally flush with the outer surface of the barrel, and to that end it is provided with a raised portion 218, corresponding in its dimensions with the bearing portion 208 of the barrel. In front of this the key is provided with a projection 219, extending outward beyond the surface of the barrel when the key is in place, and between the projections 218 and 219 the key has a notch 220 to accommodate the barrel-plate 213 when the key is turned. A locking-lever 221, pivoted between its ends at 222 on the outer face of the frame member 15, has one of its ends operatively connected to the locking-bolt 44, which controls the slide-bars, while its other end is operatively connected to and controls a locking-bolt 223, which locks the printing-carriage against movement in a direction such as to enable it to print a record from the front or trip row of counters. The connection is shown as effected in the former case by means of a pin 224 on the locking-plate 44, which engages between the walls of an open-ended slot 225 in the lever 221. In the construction at the other end of the lever the locking-bolt 223 is shown as provided with a pin 226, which extends through a slot 227 in the frame member 15 and engages an open-ended slot 228 in the end of the lever 221. The locking-lever 221 is itself operated by means of a locking-arm 229, pivoted at 230 to the frame member 15 immediately outside of the barrel-plate 213 and extending around the projecting end of the barrel 207, around which it extends a little more than half-way, as shown more particularly in Figs. 5 and 40. The locking-arm operates the locking-lever through the medium of a pin or stud 231 on the locking-arm, which engages a slot 232 in the lever immediately below its pivot. The locking-arm in addition to the necessary slot 233 for the passage of the bits or projections of the key is provided near its free end with a recess or notch 234, bounded on one side by a comparatively long wall or tooth 235 and on the other side by a comparatively short wall or tooth 236. The construction and arrangement of these parts are such that when the conductor's key is inserted and turned the locking-lever is not effected in any way until just as the key reaches the end of its movement of rotation. At this time the key projection 219 passes by the tooth 236, which is too short to lie in its path when the locking-arm 229 is in its normal position, and as the key continues to turn the projection 219 comes into contact with the tooth 235 and swings the locking-arm up into the position shown in Fig. 40. This so moves the locking-lever 221 as to withdraw the locking-plate 44 and bolt 223, thereby leaving the slide-bars free to be actuated to register the fares and the printing mechanism free to operate to print a record from the first row of counters. When the key thus moves the locking-arm, however, it will be noted that as the free end of said arm moves upward the short tooth 236 swings in behind the key projection 219 and lies in the path of the same. From this construction it follows that as soon as the key is turned in the opposite direction it moves the locking-arm back to its original position by reason of its contact with the tooth 236 and restores the parts to locked position at the very beginning of the movement of the key. It will be understood, of course, that when the locking-arm 229 reaches its normal position the tooth 236 swings out of the path of the key projection 219, leaving the key free to be rotated back to its initial position, so that it may be removed.

The cashier's or inspector's identifying mechanism and the locking mechanism controlled thereby are somewhat similar. The rotating barrel, which receives the key, is indicated by the reference-numeral 237, and it has a central bearing portion 238, which fits in a bearing-aperture in the frame member 15. The barrel has the usual reduced portion 239 to receive the printing-wheels; but since the number of cashiers employed is relatively small compared with the number of conductors it is found that a two-wheel counter is sufficient for this purpose, and the part 239 is therefore correspondingly shortened. Said barrel also has a journal portion 240 and shoulder 241 to limit inward motion. Its outer motion is limited by a plate 242, which bears against a collar 243 on the barrel. Between said collar and the bearing portion 238 there is a groove 244, which receives the locking-arm hereinafter referred to. The cashier's key (indicated by the reference-numeral 245) has selective projections 246 at its inner end and a projection 247, corresponding in character and function to the projection 217 of the conductor's key. It also has a raised portion 248, corresponding to the raised portion 218 of the conductor's key, to bring it out flush with the outer surface of the bearing portion 238 of the barrel. This raised portion or projection 248 extends across the groove 244 to the collar 243 and forms a tooth or projection to operate the locking-arm. This latter (indicated by the reference-numeral 249) is pivoted at 250 on one side of the barrel 237 and extends over and around the same somewhat more than half-way, as in the case of the locking-arm 229. It has an arm or extension 251, which engages a pin 252, projecting outward through a slot 253 from the locking-bolt 254, which latter locks the printing-carriage against movement in a direction such as to enable it to print from the rear or daily-total row of printing-counters. The locking-arm 249, like the locking-arm 229, is provided at its free end with a notch 255, having on one side a long tooth 256 and on the other side a short tooth 257. The tooth 256 extends into the groove 244 of the barrel when the parts are in locked position, and when the key has been inserted and turned almost completely, just at the end of its rotation, the portion of the projection 248 which extends into the groove 244 engages the tooth 256 and swings the locking-arm 249 upward, lifting the locking-bolt 254 out of the path of the printing-carriage. As soon as the key begins to move in the opposite direction it engages the tooth 257, which has been moved into its path, and the locking-arm is moved downward again, moving the locking-bolt back into locking position. Thus in the case of the cashier's key also the identifying printing-wheels must be in proper printing position before the locking mechanism is released, and the printing mechanism becomes again locked before the identifying characters are out of printing position.

In order to insure the printing of a record after it has been compiled by the actual operation of the machine and to prevent the destruction of the data for said record before it is printed, provision is made for locking the counter-resetting shafts 19 and 20 against movement until after a record has been printed therefrom, the locking mechanism again becoming operative after such printing, so that it is always necessary to actuate the printing mechanism so as to print a record from a given set of counters before that particular set can be reset to zero. The printing mechanism as in the prior Letters Patent No. 764,494, hereinbefore referred to, comprises a reciprocating carriage 258, normally locked in central position and carrying an impression-roller 259 and inking-roller 260. It is driven by means of racks 261 on its side members, with which mesh gears 262 on the printing-shaft 263. This latter is mounted in the frame members 15 and 16, beyond which it projects at each end. One end, which extends through a suitable opening 14 in the cabinet, is suitably constructed to receive an operating key or handle by which the shaft may be actuated. In the present instance it is shown as formed into a square operating or wrench-grasp head 264. The other end of the printing-shaft 263 is provided with a crank-arm 265, having a pin 266, which engages a cam-slot 267, formed in the gear-segment 268, which controls the paper-feed. It will be understood, of course, that the printing-shaft is turned in one direction when the conductor prints from the front row of counters, the pin 266 moving in the direction of the arrow shown immediately above it in Fig. 6 in that case, said shaft being turned in the opposite direction when the cashier prints from the rear row of counters. The cam-slot 267 has its two portions on opposite sides of the central position of the pin 266 differently formed, so as to give a relatively small movement of the gear-segment 268 and a relatively short feed to the paper when printing from the front or trip row of counters, while giving a relatively large movement to the gear-segment and a relatively large feed to the paper when printing from the rear or daily-total row of counters. The gear-segment 268 is pivoted to the frame member 16 by means of a pivot-stud 269, on which it is supported, and its hub is provided with a cam projection 270, which controls the locking mechanism of the front counter-shaft 19, and a cam projection 271, which controls the locking mechanism of the rear counter-shaft 20. The shaft 19 extends through the frame member 16 and is provided with an operating-head or wrench-grasp 272, accessible through an opening in the cabinet to permit said shaft to be turned in resetting its counters to zero. On the projecting portion of the shaft 19 there is secured a collar 273, provided with a stop projection 274 and a tripping-pin 275. A locking-pawl 276 is loosely mounted on the pivot-stud 269 and is arranged with its free end normally in the path of the projection 274, so as to prevent rotation of the shaft 19. A trip-arm 277 is pivoted between its ends on the locking-pawl 276, a spring 278 being connected to one of said ends and serving to hold the locking-pawl in the path of the stop projection 274. This spring also serves to so turn the trip-arm 277 on its pivot 279 as to hold the other arm or end of the spring against the cam projection 270 on the hub of the gear-segment 268. This end of the trip-arm is provided with a shoulder 280, while the other end is provided with a shoulder or projection 281. In the position of the parts shown in Fig. 6, which is the normal position, the locking-pawl 276 is in the path of the stop projection 274, and the shaft 19 cannot be turned to reset its counters to zero. When the conductor rotates the printing-shaft 263 in the direction of the arrow, however, the projection 270 on the hub of the gear-segment 268 is moved over until it passes beyond the shoulder 280 of the trip-arm 277, whereupon the spring 278 turns said trip-arm upon its pivot 279, so as to bring the shoulder 280 down into the path of the projection 270 on its return. Thereupon the projection 270 by its engagement with said shoulder 280 moves the trip-arm along with it during its return movement, and since the locking-pawl 276 is connected to the trip-arm the locking-pawl is swung back out of the path of the stop projection 274, and when the printing movement is complete said locking-pawl is held in this position and the shaft 19 is free to rotate. Rotation of said shaft 19 to reset its counters to zero causes the trip-pin 275 to come into contact with the shoulder 281 on the other end of the trip-arm 277 and depressing said end lifts the end which has the shoulder 280 until said shoulder is clear of the projection 270. As soon as this occurs the spring 278 moves the trip-arm and locking-pawl back into the position shown in the drawings, and the shaft 19, after completing its revolution, is again locked against movement in the direction necessary for resetting the counters. It will be understood, of course, that said shaft is locked against movement in the opposite direction at the end of its complete revolution by the character of the mechanism employed to reset the counters to zero. The mechanism just described provides a positive stop, which prevents the resetting-shaft from being turned too far and limits its movement to one complete revolution.

The rear shaft 20 is provided with a similar locking mechanism. Said shaft has an operating-head or wrench-grasp 282, which, like the head 272, is accessible through a suitable opening in the cabinet. Said shaft has secured to it a collar 283, provided with a stop projection 284 and a trip-pin 285. A locking-pawl 286, pivoted at 287, has a projection or shoulder 288, which is held normally in the path of the stop projection 284 by means of a spring 289. The free end of the locking-pawl 286 lies in the path of the cam projection 271 on the hub of the gear-segment 268. Beyond its pivot 287 the locking-pawl 286 is provided with an extension 290, on which normally rests the end of a tooth 291 on one end of a trip-arm 292, pivoted between its ends at 293. The other end 294 of the trip-arm lies in the path of the trip-pin 285. The normal or locked position of the parts is that shown in the drawings, and in said position the shaft 20 is locked against movement. When the cashier or inspector prints a record from the rear row of counters, turning the printing-shaft 263 in a direction the reverse of that indicated by the arrow in Fig. 6, the cam projection 271 on the hub of the gear-segment 268 comes into contact with the free end of the locking-pawl 286 and depresses said pawl, so as to withdraw the projection or shoulder 288 from in front of the stop projection 284 on the shaft-collar. At the same time the pawl extension 290 moves its free end in front of the tooth 291, which is caused by the spring 289 to engage back of said extension and hold the parts in the position thus assumed, with the shaft 20 free to move. When said shaft is rotated to return its counters to zero, the trip-pin 285 comes into contact with the extremity 294 of the trip-arm 292 and moves the tooth 291 at the other extremity thereof upward until the locking-pawl extension 290 moves back under it into the position shown in the drawings under the influence of the spring 289. This movement of the pawl extension is of course accompanied by a corresponding movement of the locking-pawl proper, which brings the projection 288 once more into the path of the stop projection 284. The rotary movement of the shaft 20 is therefore arrested at the proper moment after one complete rotation by the contact of the projections 284 and 286, and the shaft is again locked against movement until the printing mechanism is again operated.

It will be understood that during the printing of a record from the rear row of counters the locking mechanism of the front counter-shaft is undisturbed, for the reason that the projection 270 travels along that portion of the trip-arm 277 which lies beyond the shoulder 280 and whose contact surface is concentric with the pivot-screw 269, so that no motion of the trip-arm 277 results. Obviously the locking mechanism of the rear counter-shaft is unaffected during the printing from the front row of counters, since the movement of the projections 271 during such printing does not cause it to approach the locking-pawl 286 any nearer than in its normal position, as shown.

The mechanism for locking the counter-resetting shafts until after a record has been printed therefrom coöperates directly with the mechanism whereby the counter-resetting shafts and actuating-shaft are interlocked against relative movement except when in their normal positions, such coöperation serving to prevent the printing of a false record from the machine by turning either one of the counter-resetting shafts backward to zero position after partly turning it in the proper direction to reset the counters to zero, for it will be seen that when either of said resetting-shafts is free it can be turned a portion of a revolution in a direction such as to pick up and turn toward zero some of the counters, thereby diminishing the amount which they will record, and then be turned back in the wrong direction to zero, thereby leaving the counters in a position to print a false record. To avoid this, provision is made for preventing the turning back of the counter-resetting shafts to zero by means of the locking mechanism, which is controlled from the printing mechanism, so that after either of said shafts has started to make the full revolution by which it resets its counters to zero it can only be brought to zero or normal position by completing said full revolution in the proper direction, and since the resetting-shafts are interlocked with the actuating-shaft in such a way that this latter cannot be operated unless the resetting-shafts are at zero it will be seen that the machine cannot be used for registering fares until a record has been printed and the counters from which said record is taken have been properly returned to zero. This result is accomplished by reason of the fact that the stop projections 274 and 284 and their coöperating pawls 276 and 286 are so constructed that said pawls engage said stop projections on either side thereof in such a way as to prevent further rotation of said shafts in one direction when said pawls are in engagement with one side of said stop projections and to prevent rotation of said shafts in the opposite directions when said pawls are in engagement with the other side of said stop projections. In practice, as already stated, when the parts are in the position shown in Fig. 6 neither shaft can be turned in either direction; but when the locking-pawl of either shaft is withdrawn by operating the printing mechanism, then when said shaft is turned in the only direction in which it can be turned at that time, which is the direction which acts to reset the counters to zero, as soon as its locking projection has passed the pawl said pawl is tripped and falls back into locking position behind the stop projection. If, therefore, it is sought to turn the shaft backward to zero position, said pawl, engaging the rear face of the stop projection, prevents the operator from accomplishing his purpose by preventing further backward rotation of the resetting-shaft before it has reached the zero position. Therefore if the operator wishes to further use the machine to register fares he must turn the resetting-shaft forward in the proper direction until it reaches zero position and becomes automatically locked therein, since otherwise the interlocking disk 202 or 203 of the particular resetting-shaft in question will be in such a position as to prevent rotation of the actuating-shaft 47 by reason of its engagement with the interlocking disk 204 thereof and will prevent the register from operating. It will thus be seen that the locking mechanism of the resetting-shafts is so organized as to compel a complete rotation of said shafts in the proper direction before they can be returned to zero, and since it is necessary to have these shafts in zero position before the actuating-shaft can be operated the operator is compelled to properly turn the resetting-shafts to zero before he can further operate the machine.

The paper-feeding mechanism is substantially identical with that of Patent No. 764,494, hereinbefore referred to. The gear-segment 268 meshes with a gear 295, which is connected by a ratchet-clutch 296 with the shaft 297 of the upper feed-roll 298, which latter is made in separated sections, preferably of roughened metal. The shaft 297 carries a gear 299 at its other end, which meshes with a gear 300 on the shaft 301 of the lower feed-roll 302, which latter is preferably of rubber or the like, and which may be swung toward and from the upper feed-roll by levers 303. A ratchet-wheel 304 and pawl 305 prevent rotation of the feed-rolls in the wrong direction.

The group of printing-wheels K is employed to print the number of the car in which the machine is being used for the time being, and as the machines are sometimes shifted to different cars provision is made for readily changing the number which these wheels will print. To this end there is employed a construction shown more particularly in Figs. 53 to 58, inclusive, of the drawings. In this construction, 306 indicates a shaft the inner end of which is mounted in one of the bearing-brackets 165 of the shaft 166. This shaft extends out through the side member 15 of the frame and also out through the opening 10 in the cabinet. To its inner end there is secured a gear 307, while its outer end has detachably secured thereon a ring or dial 308. This construction is preferably effected by means of a screw 309, which is threaded one-half in the shaft and one-half in the dial, as shown in Fig. 54. The outer face of the dial 308 has marked upon it the numerals from "0" to "9," and there is formed in said dial an aperture 310 to receive a suitable tool 311, (shown in Fig. 54,) by means of which the dial, shaft, and gear 307 may be rotated. Adjacent to the gear 307 there is mounted loosely on the shaft 306 a gear 312, having a sleeve-like extension 313 of its hub, which is rotatably coupled to a sleeve 314, loosely mounted on the shaft 306. The outer end of the sleeve 314 is rotatably coupled to a sleeve-like extension 315 of an indicating disk or ring 316, mounted loosely on the shaft 306 and having in its face a recess 317 to receive the indicating-disk 308. The exposed annular face of the disk 316, which is flush with the face of the disk 308, has marked upon it the numerals from "0" to "9," and there is formed in this portion of said disk a recess or aperture 318 to receive the operating-tool 311. On the sleeve-extension 313 of the gear 312 there is loosely mounted a gear 319, the hub of which is rotatably coupled to the inner end of a sleeve 320, the outer end of which is rotatably coupled to an indicating-disk 321, provided with a sleeve-like hub 322, to effect this coupling. The disk 321 is provided in its outer face with a recess 323, into which the disk 316 fits. The outer annular face of the disk 321 has marked upon it the numerals from "0" to "9," inclusive, and lies flush with the faces of the two other disks, there being also provided a recess or aperture 326 therein to receive the operating-tool 311. The sleeve 320 fits a suitable bearing-aperture in the frame member 15 and in a bracket 327, similar to the bracket 165, so that the shaft 306 and the sleeves surrounding the same are effectively supported. A collar 328 on the sleeve 320 bears against the inner face of the frame member 15 and prevents longitudinal displacement of the parts. The gears 312 and 319, the indicating-disks by which they are operated, and the intermediate sleeves are held in position between the gear 307 and its disk 308. Each of the gears 307, 312, and 319 controls one of the three number-printing wheels 329 of the group K, so that each wheel may be independently set to print any desired number. This is effected through the medium of intermediate gears 330, mounted on the transfer-shaft 198, there being three of these gears, meshing, respectively, with the three gears 307, 312, and 319 and with the driving-gears of the three number-printing wheels 329. Spring-actuated detent-pawls 331, engaging with the gears 330, serve to hold the number-printing wheels and indicating-disks against accidental displacement from the position to which they have been adjusted. It will be observed that the indicating-disks are smooth and flush with each other and almost flush with the cabinet, so that they present no projections, such as the ordinary milled knobs or heads, which might be accidentally engaged and so moved as to displace the number-printing wheels. Furthermore, while the operating-disks are readily moved by an authorized person provided with the necessary instrument or operating-tool, the difficulty of operating them without such a tool is sufficient to deter an unauthorized person from attempting to operate them through curiosity or from some wrong motive.

In addition to the various printing counters and wheels hereinbefore described, mounted on or alined with the counter-shafts 19 and 20, there is employed a group of date-printing wheels, (indicated as a whole by the reference character N and shown in position in Fig. 9 of the drawings.) The particular mechanism by which these wheels are operated is similar to that employed for operating the car-number-printing wheels just described and is illustrated in Fig. 59. It differs from the car-number mechanism in that the printing-wheels are not driven by intermediate gearing, but are mounted directly on the shaft or sleeves which operate them. 332 indicates a shaft mounted in brackets 333 and in the frame member 15, beyond which it extends. It supports at its inner end a printing-wheel 334, on which the names of the months or abbreviations thereof are placed in printing character. At its outer end it is provided with an indicating-disk 335, having similar characters thereon. 336 indicates a number-printing wheel for printing the tens of the numerals indicating the day of the month, said wheel being coupled to the inner end of a sleeve 337, which surrounds the shaft 332, and which is provided at its outer end with an indicating-disk 338. 339 indicates a number-printing wheel for printing the units of the numerals indicating the day of the month, said wheel being coupled to the inner end of a sleeve 340, the outer end of which is coupled to an indicating-disk 341. The indicating-disks of this mechanism are nested the one within the other, with their indicating-faces flush with each other and practically so with the outer face of the cabinet, as in the case of the indicating-disks of the car-number-printing mechanism, the cabinet being provided with an opening 11 for said indicating-disks. The outer faces of the disks are radially grooved, as indicated at 342, forming the means whereby they may be moved and set to any desired position through the medium of a suitable tool or instrument, such as a screw-driver or the like. A pawl 343ª is mounted on the exterior of the cabinet and arranged to engage the grooves 342, thereby holding the parts in position after they have been adjusted to print any desired date.

Referring now to the printing mechanism whereby the impression which forms the record is taken from the various printing-wheels, it is in a general way similar to that of Letters Patent No. 764,494, hereinbefore referred to. Provision is made, however, for simplifying the construction and doing away with the switches and their controlling-springs which regulate the travel of the impression-roller in the guiding-grooves which constitute the cam-track. The roller 259 is provided at the ends of its shaft 343 with pins 344, pressed outward by springs 345. The side plates 346, in which the cam-tracks are formed, are constructed, as shown more particularly in Figs. 60 to 64, inclusive, of the drawings. Each plate has a cam-track provided, as heretofore, with a front loop and a rear loop formed by a groove in the plate in which the corresponding spring-pin 344 travels, the roller-shaft 343 moving in vertical grooves 347 in the carriage. Each cam-groove from its central portion 348 has its forward loop formed by a downward incline 349, a forwardly-extending horizontal portion 350, an upwardly and rearwardly inclined portion 351, and a horizontal rearwardly-extending portion 352. The bottom of the groove against which the spring-pin 344 is pressed is so formed as to control the travel of the said pin, and to this end there is formed on the bottom of said groove in the forwardly-extending portion of the front loop an incline 353, leading to a shoulder 354, which prevents return of the pin along the portion it has just traversed. Similarly, in the rearwardly-extending portion of said front loop there is formed an incline 355, leading to a shoulder 356, which insures the travel of the pin downward and forward along the portion 349 of the loop during its forward movement. The rear loop comprises a horizontal rearwardly-extending portion 357, a downwardly and forwardly extending portion 358, a horizontal forwardly-extending portion 359, and an upwardly and forwardly extending portion 360. In the part 357 of the rear loop the bottom of the groove is provided with an incline 361, leading to a shoulder 362, which prevents the return of the pin along the part 357 and insures its travel down the part 358. The portion 360 of this rear loop has on its bottom a similar incline 363, leading to a shoulder 364, which prevents the pin from returning along the part 360 and insures its travel along the part 357.

The paper on which the records are printed is used in the form of a continuous sheet or web supplied in the form of a roll, (indicated by the reference-numeral 365.) This roll is supported on a shaft 366, which is mounted in brackets 367 and 368, projecting, respectively, from the frame members 16 and 15. The shaft 366 has secured thereon near one end a head 369, and a similar head 370 is secured to the inner face of the bracket 367 at the other end of the shaft. The head 370 and bracket 367 have an aperture and recess 371 of corresponding shape, as shown in dotted lines in Figs. 6 and 10, to receive the adjacent end of the shaft 366, which is held therein against lateral and downward movement, but is free to move endwise therein to a limited extent. At its other end the shaft 366 has its sides flattened, as indicated at 372, and has a downwardly-extending projection 373 of a width equal to the width of the flattened portion of the shaft. The bracket 368 is vertically slotted, as indicated at 374, the body of the slot having a width equal to the width of the projection 372 and flattened end of the shaft, while the lower portion has a receiving-mouth for guiding the end of the shaft into the slot, the same being formed by upwardly-converging walls 375. In the slot 374 there is mounted a pawl 376, pivoted at its upper end at 377 and provided at its lower end with a beveled or inclined surface 378, terminating at its upper extremity in a shoulder 379. Immediately adjacent to this shoulder the pawl has a contact-surface 380 adapted to bear against the end of the shaft 366. A spring 381, lying back of the pawl 376, forces it normally outward against the end of the shaft, its movement being limited, however, by a stop-arm 382, which comes into contact with a stop-shoulder 383 of the bracket. The spring 381 is inserted from the inner side of the bracket through a socket or aperture 384, formed to receive the same, and since the shaft 366 lies in this socket or aperture when in position the projection 373 is provided for the purpose of preventing the shaft from rotating when in position. The parts are so proportioned that the distance between the heads 369 and 370 when the parts are in the position shown in Fig. 72 is somewhat less than the length of the paper-roll 365. It will be seen that the paper-roll may be slipped onto the shaft over the headless end thereof, which end may be readily engaged in the recess 371. The other end of the shaft is then introduced from below into the bracket 368, being guided into the same by the converging walls 375 and being positioned by the fitting of its flattened end in the slot 374. As the shaft end moves upward it comes in contact with the bevel-surface 378 of the pawl 376 and forces said pawl backward as the shaft moves upward until said shaft has passed the shoulder 379. The pawl 376 is then moved by its spring into the position shown in the drawings, with its shoulder 379 under the shaft to support it and prevent it from dropping, while its surface 380 presses against the end of the shaft and forces the same toward the head 370. This places a tension upon the paper-roll, since the heads 369 and 370 are pressed with a frictional contact against its ends by the spring 381, such tension preventing the paper from prematurely unrolling or feeding forward too freely. The shaft may be readily removed either by moving it so as to press back the pawl at one end, and thereby permit the disengagement of the other end, or by moving back the pawl by lifting the arm 372 thereof. The paper as it is drawn from the roll before being led to the printing-carriage passes around a guide-roller 385, extending across the rear of the machine below the paper-roll.

A suitable audible signal is employed actuated each time a fare is registered to announce the act of registration and call attention to the register. A bell is preferred for this purpose, the same being indicated by the reference-numeral 8. It is supported on the cross-bar 18, as is also its striker 386, which is pivoted thereon at 387, the cross-bar having a bracket 388 to receive the same. A spring 389 presses the striker toward the bell, and a stop 390 limits its movement in that direction, holding it clear of the bell after it has delivered its blow. The striker is actuated from the shaft 47 by means of a spiral cam 391 thereon, against which the lower end of the striker is held by the spring 389. The cam 391 terminates in a shoulder 392, which the striker reaches just as the shaft completes its revolution, the striker being then forced over by the spring to ring the bell; but this does not occur, however, until the actuating-shaft has made a complete revolution, and thereby completed the registration of a fare.

The shafts 19 and 20 are supported, in addition to the support which they receive where they pass through the frame member 16, by means of brackets 393, projecting from the frame-bars 394, connecting the frame members 15 and 16. These frame-bars also support the shafts 198 and 395, on which are mounted the detent and transfer wheels 396 of the various counters and printing-wheels. Detent-pawls 397 engage with the wheels 396, said pawls being mounted in slots in the frame-bars 394 and being pivoted on shafts 398, supported in said frame, the pawls being backed by springs 399.

The various printing-wheels extend through mortises or recesses 400 in a printing-plate 401, said printing-plate having suitable legends thereon to complete the printed record. A specimen of this record is shown in Fig. 76, from which it will be seen that the same comprises a lower portion printed from the front row of counters controlled by the conductor and forming a consecutive trip-record of which each line is a record of a trip. It will be seen that each trip-record gives for the trip the number thereof, the total amount of cash received, the total number of fares received of each of the six different species with which the machine deals, the total number of passagers, the car-number, and the conductor's number. The upper portion of the record constitutes a daily total record and gives for the day the total number of trips made, the total amount of cash received, the total number of fares received of each of the six different specific kinds of fare, the total number of passengers carried, and the number of the cashier who printed the record. In addition to this the imprint of the grand-total register is given and the date is also printed.

The general operation of the machine will be readily understood from the foregoing description, taken in connection with the Ohmer patent, No. 764,494, hereinbefore referred to. Attention is particularly directed to the fact that the machine is very compact and comparatively light and that the counter-actuating mechanism is simple and highly efficient. Special provision is made for insuring the identification of the operator by compelling a complete operation of the operator's key before the unlocking of the printing mechanism, which latter is held locked at all times except when the operator's identifying-number is in printing position. Furthermore, provision is made for preventing the turning back to zero of the counters without printing a record therefrom, the construction being such that a record must be printed before the counters can be reset to zero. Other features of advantage have been hereinbefore pointed out in the detailed description of the various features of construction.

The fare-indicating mechanism, hereinbefore described, and illustrated in the accompanying drawings, is not claimed in this application, as the same will form the subject-matter of a separate application to be filed hereafter.

It is to be understood that the present invention is not limited to the exact details of construction shown and described, for obvious modifications will occur to a person skilled in the art.

Having thus fully described the invention, what is claimed as new, and desired to be secured by Letters Patent, is—

1. In a machine of the character described, an actuating-shaft and means for rotating the same, in combination with a plurality of specific fare-counters alined adjacent thereto, a corresponding plurality of actuating members mounted on said shaft and movable longitudinally thereon, and means for moving any one of said actuating members into operative relation with its counter, said actuating member revolving with said shaft when in operative position, substantially as described.

2. In a machine of the character described, an actuating-shaft and means for rotating the same, in combination with a plurality of specific fare-counters alined adjacent thereto, a corresponding plurality of actuating members mounted on said shaft, rotating in unison therewith and movable longitudinally thereon, and means for moving any one of said actuating members into operative relation with its counter, substantially as described.

3. In a machine of the character described, an actuating-shaft, in combination with a plurality of specific fare-counters alined adjacent thereto, a corresponding plurality of actuating members mounted on said shaft, a corresponding plurality of actuating slide-bars, an actuating mechanism intermediate said slide-bars and the actuating-shaft whereby actuation of any one of the slide-bars imparts a movement of rotation to said shaft, and mechanism connecting each slide-bar with the corresponding actuating member, whereby actuation of said slide-bar establishes operative relations between said actuating member and its counter, substantially as described.

4. In a machine of the character described, an actuating-shaft and means for rotating the same, in combination with a plurality of fare-counters alined adjacent thereto on one side, a corresponding plurality of similar fare-counters alined adjacent thereto on the other side, and means for establishing exclusive operations between any one of said actuating members and the two counters corresponding therewith, substantially as described.

5. In a machine of the character described, an actuating-shaft and means for rotating the same, in combination with a plurality of fare-counters alined adjacent thereto on one side, a corresponding plurality of similar fare-counters alined adjacent thereto on the other side, means for establishing exclusive operations between any one of said actuating members and the two counters corresponding therewith, and means for separately resetting to zero the counters of each group, substantially as described.

6. In a machine of the character described, an actuating-shaft and means for rotating the same, in combination with a plurality of actuating members mounted thereon, two groups of fare-counters located on opposite sides of said shaft and each comprising a plurality of counters corresponding in number and location with the actuating members, and means for moving any one of said actuating members into operative relation with the two corresponding counters of the two groups, said actuating member rotating with the shaft when in operative position, whereby its two counters are actuated, substantially as described.

7. In a machine of the character described, an actuating-shaft and means for rotating the same, in combination with a plurality of fare-counters alined adjacent thereto and separated from each other by intermediate spaces, a corresponding plurality of actuating members mounted on said shaft so as to rotate in unison therewith and movable longitudinally thereon, said actuating members lying normally opposite the intermediate spaces between the counters, and means for moving any one of said actuating members longitudinally of the shaft into operative position relatively to the corresponding counter, substantially as described.

8. In a machine of the character described, a counter-actuating shaft, in combination with a drive-shaft operatively connected therewith, a gear connected with said drive-shaft so as to turn therewith in one direction only, a gear-segment meshing with said gear, a plurality of actuating slide-bars controlling the different fare-counters, and a part moving in unison with said gear-segment and lying in the path of said slide-bars, which latter are adapted to engage the same, whereby movement of any one of said slide-bars imparts a movement of rotation to said shaft, substantially as described.

9. In a machine of the character described, a counter-actuating shaft, in combination with a drive-shaft operatively connected therewith, a gear connected with said drive-shaft so as to turn therewith in one direction only, a gear-segment meshing with said gear, a rock-shaft carrying said gear-segment, a plurality of actuating slide-bars controlling the different fare-counters, and a contact-bar carried by said rock-shaft and arranged in the path of the slide-bars, which are adapted to engage the same, substantially as described.

10. In a machine of the character described, a counter-actuating shaft, in combination with a drive-shaft operatively connected therewith, a gear connected with said drive-shaft so as to turn therewith in one direction only, a gear-segment meshing with said gear, a rock-shaft carrying said gear-segment, a plurality of actuating slide-bars controlling the different fare-counters, and a contact-bar carried by said rock-shaft and arranged in the path of the slide-bars, which are adapted to engage the same to move the rock-shaft in one direction only, said slide-bars and rock-shaft being provided with parts engaging in the opposite direction to move the rock-shaft in the opposite direction, substantially as described.

11. In a machine of the character described, an actuating-shaft having actuating members thereon, and a plurality of fare-counters alined adjacent thereto, in combination with a corresponding plurality of actuating slide-bars arranged in a horizontal plane transversely of the machine, and mechanism whereby the actuation of each slide-bar rotates the actuating-shaft and brings the corresponding actuating member into operative relation with its counter, substantially as described.

12. In a machine of the character described, an actuating-shaft having actuating members thereon, and a plurality of fare-counters alined adjacent thereto, in combination with a corresponding plurality of actuating slide-bars arranged in a horizontal plane transversely of the machine, and mechanism whereby the actuation of each slide-bar rotates the actuating-shaft and brings the corresponding actuating member into operative relation with its counter, said mechanism comprising a rock-shaft above the slide-bars, a contact-bar having arms whereby it is connected to said rock-shaft and lying below the slide-bars, projections on said slide-bars to engage the contact-bar, and mechanism intermediate said rock-shaft and actuating-shaft whereby the movement of said rock-shaft in one direction imparts a movement of rotation to the actuating-shaft, substantially as described.

13. In a machine of the character described, a plurality of slide-bars provided with downwardly and laterally extending projections, a rock-shaft provided with arms between which the slide-bars pass, a contact-bar carried by said arms and lying in the path of the downward projections to move the rock-shaft in one direction, and arms carried by the rock-shaft and acting against the lateral projections to move the rock-shaft in the opposite direction, substantially as described.

14. In a machine of the character described, the combination, with a rock-shaft provided with a gear-segment, and means for operating the same, of a counter-actuating shaft, a drive-shaft operatively connected therewith, a gear meshing with the segment and mounted on the drive-shaft to turn therewith in one direction only, and means for positively arresting the rotation of said drive-shaft at the end of each revolution, substantially as described.

15. In a machine of the character described, the combination, with a rock-shaft provided with a gear-segment, and means for operating the same, of a counter-actuating shaft, a drive-shaft operatively connected therewith, a gear meshing with the segment and mounted on the drive-shaft to turn therewith in one direction only, and means for positively locking the drive-shaft against movement in either direction at the end of each revolution, substantially as described.

16. In a machine of the character described, a plurality of actuating slide-bars, and a rock-shaft actuated thereby and provided with a gear-segment, in combination with a counter-actuating shaft, a drive-shaft operatively connected therewith, a gear meshing with the segment and mounted on said drive-shaft so as to rotate therewith in one direction only, means for locking said drive-shaft against further movement at the end of each revolution, and trip mechanism actuated by the slide-bars for releasing said locking means to permit the next revolution, substantially as described.

17. In a machine of the character described, a plurality of actuating slide-bars, and a rock-shaft operated thereby and provided with a gear-segment, in combination with a drive-shaft provided with a collar having a stop-shoulder, a second rock-shaft having a stop-arm lying normally in the path of said shoulder, and a trip-plate carried by said second rock-shaft and adapted to be engaged by the slide-bars to withdraw the stop-arm, substantially as described.

18. In a machine of the character described, the combination, with a plurality of counters, and an actuating-shaft having a corresponding plurality of actuating members movable longitudinally thereon, of a plurality of actuating slide-bars, mechanism controlled thereby for rotating the actuating-shaft, and rock-shafts having members engaging the slide-bars and actuating members, whereby the movement of a given slide-bar will move the corresponding actuating member into operative position, substantially as described.

19. In a machine of the character described, slide-bars provided with cam-surfaces, an actuating-shaft having actuating members movable thereon, and intermediate rock-shafts operatively connected with the actuating members and each provided with an arm bearing against the cam-surface of the corresponding slide-bar, substantially as described.

20. In a machine of the character described, an actuating-shaft provided with actuating members movable longitudinally thereon and stops for limiting their movement, rock-shafts having yokes engaging said actuating members and arms provided with contact-rollers, and slide-bars having recesses in which said rollers normally lie, each with an incline and an adjacent flat bearing-surface, and a projection extending across said recess to insure the engagement of the roller therewith, substantially as described.

21. In a machine of the character described, a cash-adding counter, and a plurality of specific fare-counters for different cash-fares alined side by side, in combination with an actuating-shaft, a sleeve mounted to rotate with and slide longitudinally on said shaft, said sleeve having separate actuating-teeth for the specific fare-counters and a plurality of groups of teeth for the cash-adding counter, said groups corresponding with the specific cash-fares of the other counters, all of said teeth lying normally out of register with the counters, and means for shifting said sleeve longitudinally on the shaft to different positions to bring the same into operative relations with either one of the specific fare-counters, the corresponding group of teeth being simultaneously brought into operative relations with the cash-adding counter, substantially as described.

22. In a machine of the character described, a frame, an actuating slide-bar movable longitudinally therein and having a pin provided with flattened sides terminating in supporting-shoulders, in combination with a coiled spring secured at one end to the frame, and a connecting-piece provided with a threaded portion to receive the other end of the spring and having a link with an elongated opening to fit the flattened portion of the slide-bar pin, substantially as described.

23. In a machine of the character described, a counter-actuating shaft, and a plurality of slide-bars for operating the same, in combination with a single full-stroke mechanism controlling all of the slide-bars, substantially as described.

24. In a machine of the character described, a counter-actuating shaft, a plurality of slide-bars, a rock-shaft actuated by the movement of any one of the slide-bars and operatively connected with the actuating-shaft to operate the same, and a full-stroke mechanism controlling said rock-shaft, substantially as described.

25. In a machine of the character described, a counter-actuating shaft, a plurality of slide-bars, a rock-shaft operated by any one of the slide-bars and connected with the actuating-shaft to operate the same, a ratchet-segment mounted on the said rock-shaft, a double pawl engaging said ratchet-segment in either of two positions to lock it against return movement, projections on said segments to shift the pawl, and spring-actuated means for holding said pawl in either position to which it is shifted, substantially as described.

26. In a machine of the character described, a printing-counter for printing the total number of passengers, a passenger-indicator comprising a group of indicating-wheels corresponding in number with those of the printing-counter, separate trains of gearing connecting the corresponding wheels of the indicator and printing-counter, whereby said corresponding wheels move in unison, and means for actuating said printing-counter at each registration of the machine, substantially as described.

27. In a machine of the character described, a passenger-printing counter for printing the total number of passengers, a passenger-indicator comprising indicating-wheels corresponding in number with those of the printing-counter, separate trains of gearing connecting the corresponding wheels of the indicator and counter to cause them to move in unison, means for actuating the printing-counter, and means for resetting the printing-counter to zero, substantially as described.

28. In a machine of the character described, a passenger-indicator comprising a plurality of indicating-wheels provided with lateral teeth or projections, a slide-bar movable parallel with the axes of said wheels and having corresponding teeth or projections to engage those of the wheels, and actuating means comprising a rock-shaft having an arm engaging said bar and acting to move the same into operative position at the end of the operation of the indicator-wheels, substantially as described.

29. In a machine of the character described, the combination, with trip-record counters and a resetting-shaft therefor, of a mutilated gear mounted thereon and having a cylindric peripheral portion, a pinion adapted to mesh with said mutilated gear and held against rotation when bearing on said cylindric portion, a trip-indicating wheel, and a train of gearing positively connecting said indicating-wheel and pinion, whereby the indicating-wheel is locked against movement except when actuated, substantially as described.

30. In a machine of the character described, the combination, with trip and daily total counters and their resetting-shafts, of a trip-number-printing counter loosely mounted on the trip-counter-resetting shaft, a total-trip-number-printing counter mounted on and reset to zero by the daily-total-resetting shaft, intermediate gears meshing with the corresponding wheels of said trip-counters, and a driving-gear secured on the trip-resetting shaft and actuating the intermediate gear of the units-wheels, substantially as described.

31. In a machine of the character described, the combination, with trip and daily total counters and their resetting-shafts, of a trip-number-printing counter loosely mounted on the trip-counter-resetting shaft, a total-trip-number-printing counter mounted on and reset to zero by the daily-total-resetting shaft, intermediate gears meshing with the corresponding wheels of said trip-counters, and a driving-gear secured on the trip-resetting shaft and actuating the intermediate gear of the units-wheels, said intermediate gears being provided with sleeves or shafts having exposed indicating-dials thereon, substantially as described.

32. In a machine of the character described, the combination, with trip and daily total counters and their resetting-shafts, of a trip-number-printing counter loosely mounted on the trip-counter-resetting shaft, a total-trip-number-printing counter mounted on and reset to zero by the daily-total-resetting shaft, intermediate gears meshing with the corresponding wheels of said trip-counters, and a driving-gear secured on the trip-resetting shaft and actuating the intermediate gear of the units-wheels, said intermediate gears being provided with sleeves or shafts having exposed indicating-dials thereon, and the sleeve or shaft of the intermediate gear which meshes with the units-wheels of said counters being provided with external operating means, whereby said counters may be set to any desired position, substantially as described.

33. In a machine of the character described, the combination, with trip-counters and a resetting-shaft, of an actuating-gear secured on said shaft, a direction-indicating wheel, a train of gearing connecting said direction-indicating wheel and actuating-gear, a trip-number-printing counter, a total-trip-number-printing counter, and a train of gearing connecting said printing-counters with said actuating-gear, substantially as described.

34. In a machine of the character described, a counter, and a resetting-shaft on which said counter is mounted, in combination with an actuating-shaft, an actuating member mounted thereon, and means for preventing the rotation of either of said shafts when the other is not in its normal position, substantially as described.

35. In a machine of the character described, the combination, with the parallel trip and daily total groups of counters and their resetting-shafts, of an actuating-shaft parallel with said resetting-shafts and having actuating members thereon, and means for preventing the rotation of the actuating-shaft when either of the resetting-shafts is not in normal position, substantially as described.

36. In a machine of the character described, the combination, with the parallel trip and daily total groups of counters and their resetting-shafts, of an actuating-shaft parallel with said resetting-shafts and having actuating members thereon, and means for preventing the rotation of the actuating-shaft when either of the resetting-shafts is not in normal position, said means comprising disks mounted in the same plane on said shafts and recessed or cut away to permit the shafts to rotate when in normal position, substantially as described.

37. In a machine of the character described, a counter, and a resetting-shaft on which said counter is mounted, in combination with an actuating-shaft, an actuating member mounted thereon, means for preventing the rotation of either of said shafts when the other is not in its normal position, and means for compelling a full rotation of said resetting-shaft to return the same to zero position, substantially as described.

38. In a machine of the character described, a printing-counter, and a resetting-shaft therefor, in combination with an actuating-shaft, an actuating member mounted thereon, means for preventing the rotation of said actuating-shaft when said resetting-shaft is not in its normal position, locking mechanism acting normally to prevent rotation of said resetting-shaft to turn the counters to zero, printing mechanism for releasing the locking mechanism to permit the shaft to be turned to reset the counters to zero, and trip mechanism which returns the locking mechanism to locking position during the initial portion of the rotation of said setting-shaft, said locking mechanism acting to prevent rotation of said shaft in a reverse direction to its normal position, substantially as described.

39. In a machine of the character described, an actuating-shaft and an actuating member mounted thereon, in combination with a printing-counter and a resetting-shaft therefor, means for preventing the rotation of said actuating-shaft when the resetting-shaft is not in its normal or zero position, said resetting-shaft having a stop projection and a trip projection, a spring-actuated locking-pawl held normally in the path of the stop projection and adapted to engage the same on either side to prevent further rotation of the resetting-shaft, a printing mechanism comprising a member which acts to move the locking-pawl out of the path of the stop projection, and a trip-arm acting to hold said pawl out of said path, the trip projection acting on the trip-arm during the initial portion of the rotation of the resetting-shaft to cause it to release the locking-pawl after said stop projection has passed it, substantially as described.

40. In a machine of the character described, an identifying device comprising printing-wheels, and a rotatable key for turning said wheels to a predetermined position, in combination with locking mechanism, and means whereby said key unlocks said locking mechanism at the end of the movement of said key in one direction, when the printing-wheels are in proper position, and locks said locking mechanism at the beginning of the movement of the key in the opposite direction, substantially as described.

41. In a machine of the character described, the combination, with a rotatable key and its barrel, of a locking-arm controlling the locking mechanism, said arm being engaged and operated by said key during its movements in both directions at one end of its path of motion only, said end being the end farthest from its original position when inserted, substantially as described.

42. In a machine of the character described, the combination, with a rotatable key and its barrel, of a locking-arm controlling the locking mechanism, said arm being pivoted at one side of the barrel, extending around the same to the other side, and having a recess to engage the key, with projections of different length on opposite sides of said recess, substantially as described.

43. In a machine of the character described, the combination, with a plurality of actuating slide-bars arranged in a common plane and having notches or recesses which are normally in alinement, of a locking-plate movable at right angles to the plane of said bars to engage and disengage said recesses, and a conductor's identifying-key controlling the movements of said locking-plate, substantially as described.

44. In a machine of the character described, printing-counters and a normally locked resetting-shaft therefor, in combination with printing mechanism for taking an impression from said counters, and means whereby the actuation of said printing mechanism unlocks the resetting-shaft and permits the counters to be reset to zero, substantially as described.

45. In a machine of the character described, printing-counters and a resetting-shaft therefor, stop mechanism acting normally to prevent rotation of said shaft, printing mechanism for taking an impression from said counters, means actuated by said printing mechanism for releasing the stop mechanism to permit the shaft to be turned to reset the counters to zero, and trip mechanism which returns the stop mechanism to operative position before the rotation of said shaft is complete, whereby said rotation is arrested after a complete revolution, substantially as described.

46. In a machine of the character described, printing-counters, and a resetting-shaft therefor provided with a stop projection and a trip projection, in combination with a spring-actuated locking-pawl held normally in the path of the stop projection, a printing mechanism comprising an oscillating member having a projection which acts to move the locking-pawl out of the path of the stop projection, and a trip-arm acting to hold said pawl out of said path, the trip-pin acting on the trip-arm to cause it to release the locking-pawl after said stop projection has passed it, substantially as described.

47. In a machine of the character described, trip-record-printing counters, daily-record-printing counters, and resetting-shafts on which said counters are respectively mounted, in combination with a printing mechanism for selectively printing a record from either one of said groups of counters, said printing mechanism comprising an oscillating member located between the resetting-shafts, and separate locking mechanisms for said resetting-shafts whereby they are normally locked, said oscillating member acting to unlock that one of said shafts from the counters of which a record is printed, substantially as described.

48. In a machine of the character described, a group of printing-wheels, and a corresponding group of indicating-dials operatively connected therewith, said dials being set or nested one within the other with their faces flush and provided with recesses to receive a suitable operating-tool, substantially as described.

49. In a machine of the character described, a group of printing-wheels, and a corresponding group of indicating-dials operatively connected therewith, said dials being set or nested one within the other with their faces flush and provided with recesses to receive a suitable operating-tool, said recesses being in the form of radial slots, and a spring-pawl mounted on a fixed part and adapted to engage said slots, substantially as described.

In testimony whereof we affix our signatures in the presence of two witnesses.
  WILFRED I. OHMER.
  JOHN W. HILL.
  DAVID B. WHISTLER.
  JOHN E. McALLISTER.

Witnesses to the signatures of Wilfred I. Ohmer, David B. Whistler, and John E. McAllister:
 ANDREW P. LOCHER,
 CHARLES J. HALL.

Witnesses to the signature of John W. Hill:
 H. C. TUXBURY,
 A. C. MIX.